(12) United States Patent
Stephens et al.

(10) Patent No.: US 11,669,505 B2
(45) Date of Patent: Jun. 6, 2023

(54) PARTITIONING, PROCESSING, AND PROTECTING DATA

(71) Applicant: AirMettle, Inc., Houston, TX (US)

(72) Inventors: Donpaul C. Stephens, Houston, TX (US); Neil Cohen, Oakton, VA (US)

(73) Assignee: AirMettle, Inc., Houston, TX (US)

( * ) Notice: Subject to any disclaimer, the term of this patent is extended or adjusted under 35 U.S.C. 154(b) by 42 days.

(21) Appl. No.: 17/318,580

(22) Filed: May 12, 2021

(65) Prior Publication Data

US 2021/0357377 A1     Nov. 18, 2021

Related U.S. Application Data

(60) Provisional application No. 63/023,791, filed on May 12, 2020.

(51) Int. Cl.
*G06F 16/22* (2019.01)
*G06F 16/2457* (2019.01)
*G06F 16/2455* (2019.01)
*G06F 16/27* (2019.01)

(52) U.S. Cl.
CPC ........ *G06F 16/221* (2019.01); *G06F 16/2282* (2019.01); *G06F 16/24556* (2019.01); *G06F 16/24573* (2019.01); *G06F 16/278* (2019.01)

(58) Field of Classification Search
CPC ...... G06F 16/182; G06F 16/22; G06F 16/221; G06F 16/245; G06F 16/2282; G06F 16/27

USPC ........................................................ 707/705
See application file for complete search history.

(56) References Cited

U.S. PATENT DOCUMENTS

| | | | |
|---|---|---|---|
| 9,426,219 B1* | 8/2016 | Keyser | G06F 16/254 |
| 9,507,843 B1* | 11/2016 | Madhavarapu | G06F 16/2358 |
| 9,965,539 B2 | 5/2018 | D'Halluin et al. | |
| 10,983,973 B2 | 4/2021 | Kunnatur et al. | |
| 11,030,171 B2 | 6/2021 | Shahane et al. | |
| 2012/0079364 A1* | 3/2012 | Agarwal | G06F 40/131 |
| | | | 715/234 |
| 2012/0089562 A1* | 4/2012 | Deremigio | G06F 16/254 |
| | | | 707/703 |
| 2020/0125751 A1* | 4/2020 | Hariharasubrahmanian | |
| | | | H04L 9/30 |

OTHER PUBLICATIONS

Notification of Transmittal of the International Search Report and the Written Opinion of the International Searching Authority, or the Declaration, PCT/US2021/031965, International Filing Date: May 12, 2021, 16 pages.

(Continued)

*Primary Examiner* — Hung T Vy
(74) *Attorney, Agent, or Firm* — BainwoodHuang

(57) ABSTRACT

A technique for managing data objects in a storage cluster includes splitting a data object into multiple portions at boundaries within the data object. The technique further includes transforming the portions of the data object into segments that provide individually processable units, and distributing the segments among multiple computing nodes of the storage cluster for storage therein.

54 Claims, 11 Drawing Sheets

(56) References Cited

OTHER PUBLICATIONS

Mahmud Mohammad Sultan et al: "A Survey of Data Partitioning and Sampling Methods to Support Big Data Analytics", Big Data Mining and Analytics, vol. 3, No. 2, Feb. 27, 2020(Feb. 27, 2020), pp. 85-101, XP 055827053, DOI: 10.26599/BDMA.2019.9020015 Retrieved from the Internet: URL: https://ieeexplore.ieee.org/jelx7/8254253/9007868/09007871.pdf?tp=&arnumber=9007871&isnumber=9007868&ref=aHROcHM6Ly9pZWVIeHBSB3J1LmI1ZWUub3JnL2Fic3RyYWNOL2RvY3VtZW50Lzkw MDC4ZnE=<Section 3.

A Rmbrust, M., D As , T., S Un , L., Yavuz , B., Z Hu , S., M Urthy, M., T Orres , J., Van H Ovell , H., I Onescu , A., L Uszczak , A., et al . Delta lake: high-performance acid table storage over cloud object stores. Proceedings of the VLDB Endowment 13, 12 (2020), 3411-3424.

A Rmbrust, M., G Hodsi, A., X In , R., and Z Aharia , M. Lakehouse: A new generation of open platforms that unify data warehousing and advanced analytics. CIDR.

D Ageville , B., C Ruanes , T., Z Ukowski, M., A Ntonov, V., Avanes , A., B Ock , J., C Laybaugh , J., E Ngovatov, D., H Entschel , M., H Uang , J., et al . The Snow?ake Elastic Data Warehouse. In SIGMOD (2016).

H Unt, R. S3 Select and Glacier Select—Retrieving Subsets of Objects. https://aws.amazon.com/blogs/aws/s3-glacier-select, 2018.

Y U , X., Y Ouill , M., W Oicik , M., G Hanem , A., S Erafini, M., A Boulnaga , A., and S Tone—Braker , M. Pushdowndb: Accelerating a dbms using s3 computation. In 2020 IEEE 36th International Conference on Data Engineering (ICDE) (2020), IEEE, pp. 1802-1805.

Barbalace, Antonio and Do, Jaeyoung, Computational Storage: Where Are We Today?, CIDR, 2021,http://cidrdb.org/cidr2021/papers/cidr2021_paper29.pdf.

P Ge, Chang and Li, Yinan and Eilebrecht, Eric and Chandramouli, Badrish and Kossmann, Donald, Speculative distributed CSV data parsing for big data analytics, Proceedings of the 2019 International Conference on Management of Data, 883-899, 2019 ? https://badrish.net/papers/dp-sigmod19.pdf.

Langdale, Geoff and Lemire, Daniel, Parsing gigabytes of JSON per second. The VLDB Journal, vol. 28, No. 6, p. 941-960, 2019? https://core.ac.uk/download/pdf/227192468.pdf.

W Eiss , R. A Technical Overview of the Oracle Exadata Database Machine and Exadata Storage Server. Oracle White Paper. Oracle Corporation, Redwood Shores (2012).

Tan , J., G Hanem , T., P Erron , M., Y U , X., S Tonebraker , M., D E W Itt, D., S Erafini , M., A Boul-Naga , A., and K Raska , T. Choosing a cloud dbms: architectures and tradeoffs. Proceedings of the VLDB Endowment 12, (Dec. 2019), 2170-2182.

D O , J., K Ee , Y.-S., Patel , J. M., Park, C., Park , K., and D E W Itt, D. J. Query Processing on Smart SSDs: Opportunities and Challenges. In SIGMOD (2013).

\* cited by examiner

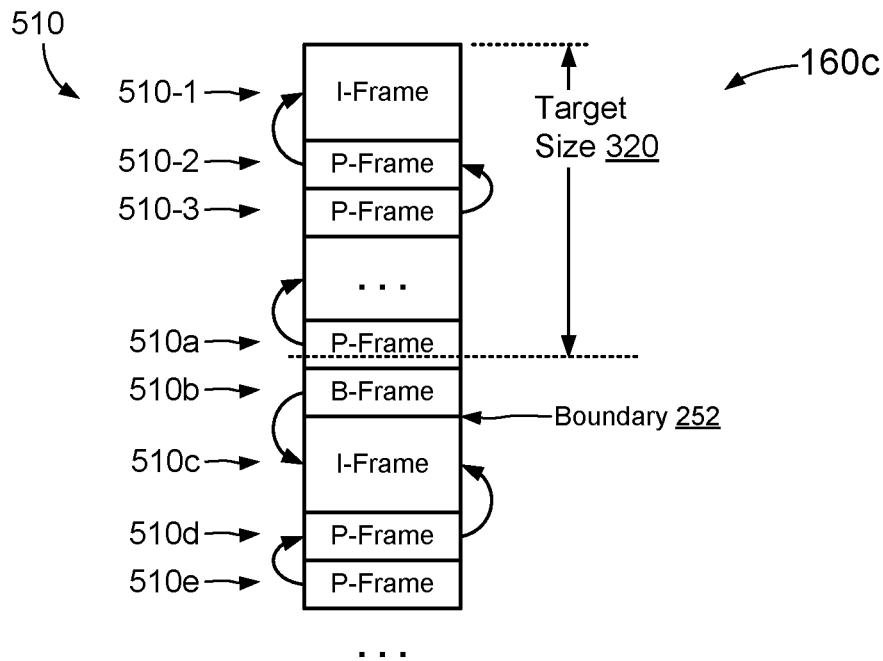
*FIG. 5A*
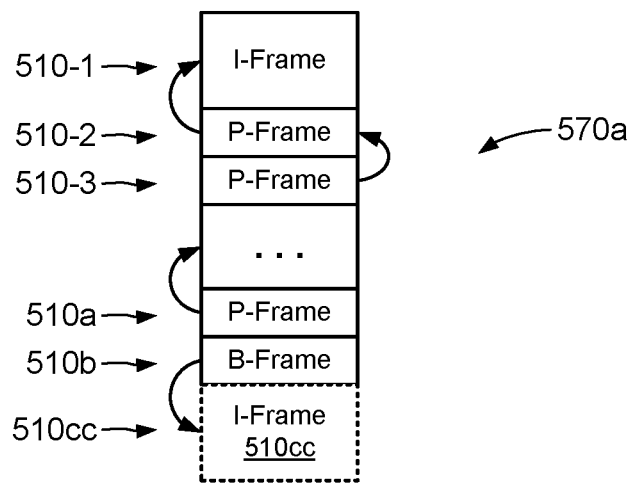
*FIG. 5B*
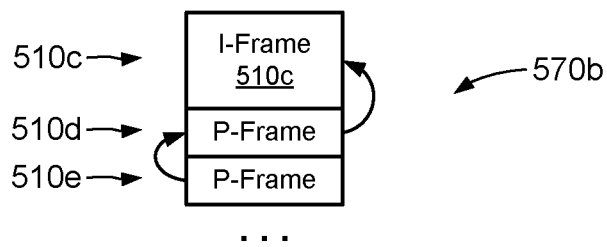

PARTITIONING, PROCESSING, AND PROTECTING DATA

CROSS-REFERENCE TO RELATED APPLICATIONS

This application claims the benefit of U.S. Provisional Application No. 63/023,791, filed May 12, 2020, the contents and teachings of which are incorporated herein by reference in their entirety.

BACKGROUND

Data processing and protection have undergone transformational change with the increased availability of inexpensive processors and storage media. Users now have the option to process and store their data locally, or to store their data on servers connected over a network, in computing clusters, or in the cloud. In addition, cloud computing options include both public cloud and private cloud offerings.

With the era of big data upon us, users wish to store and process ever more voluminous data objects. For example, it is not uncommon for tabular data, tree-based data, and audio and/or video data to reach sizes in the gigabyte range or above. Processing, protecting, and storing such large data objects presents unique challenges.

A common approach is to divide a large object into separate portions and to store the portions on respective computers. Programs may divide an object by identifying byte boundaries in the object and producing portions of equal size, or nearly so. To perform data processing on a data object once it has been stored in a distributed manner, a computer may gather particular portions or groups of portions of the original object, perform desired processing tasks on the gathered portions, and generate results.

SUMMARY

Unfortunately, the above-described distributed approach can be inefficient. For example, the practice of dividing large data objects into equal or nearly equal portions can ignore structural features and can introduce dependencies between or among different data portions. As a simple example, consider a data object containing many rows of tabular data. Dividing the object to form equal-sized portions may mean cutting off a row in the middle. Any subsequent query that involves access to the cut-off row may thus require access to two portions of the data object, one that stores the beginning of the row and one that stores the end. The two portions may typically be stored on different computers on a network.

Continuing with the above example, it may further be necessary to transfer both portions (containing both parts of the cut-off row) back to the requester or to some other node, where the portions are reassembled and a query is performed. These acts introduce large inefficiencies as they involve large copies of data over the network.

In addition to the above, the prior approach may be oblivious to content. For example, a split-off portion of a data object may lose its association with the data object as a whole. Field names may be missing for tabular data (e.g., if only row data are stored). Extracting meaningful data from a distributed object may thus involve directing many network accesses to different computers, in an effort to collect all the pieces needed to complete a desired processing task. What is needed is a more efficient way of handling large data objects.

To address this need at least in part, an improved technique for managing data objects in a storage cluster includes splitting a data object into multiple portions at boundaries within the data object. The technique further includes transforming the portions of the data object into segments that provide individually processable units, and distributing the segments among multiple computing nodes of the storage cluster for storage therein Advantageously, providing segments as individually-processable units means that the workload associated with performing a processing task on the data object can be pushed down efficiently to the computing nodes that store the segments of the data object locally. The technique thus enables true parallel processing, with each computing node performing the processing task on only the segment or segments of the data object stored therein. It also greatly reduces network traffic as compared with prior schemes. For example, high-speed connections of computing nodes to their local storage greatly enhances overall efficiency. Further, the independent nature of segments means that little or no communication is required among computing nodes (e.g., to resolve dependencies) in order to complete a processing task.

Certain embodiments are directed to a method of managing data objects. The method includes splitting a data object into multiple portions at boundaries within the data object, the boundaries providing separators between processable units of the data object in accordance with a type of the data object. The method further includes transforming the portions into segments that provide individually processable units of a same type as the type of the data object and distributing the segments among multiple computing nodes of a storage cluster for storage therein.

Other embodiments are directed to a method of managing data objects. The method includes splitting a data object into multiple segments, distributing the segments among multiple computing nodes of a storage cluster, and performing a distributed processing task by the storage cluster. The distributed processing task executes independently by multiple respective computing nodes of the storage cluster on respective segments or sets of segments stored therein.

Still other embodiments are directed to a method of managing data objects. The method includes splitting a data object into multiple segments, wherein at least some of the segments having lengths that differ from one another. The method further includes distributing the segments across multiple computing nodes of a storage cluster, and protecting K of the segments using M elements of repair data generated from the K segments, each of the M elements having multiple ranges that store repair data computed from respective groupings of segments selected from the K segments.

Additional embodiments are directed to a computerized apparatus constructed and arranged to perform a method of managing data objects, such as any of the methods described above. Still other embodiments are directed to a computer program product. The computer program product stores instructions which, when executed on control circuitry of a computerized apparatus, cause the computerized apparatus to perform a method of managing data objects, such as any of the methods described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

FIGS. 5A and 5B are block diagrams that show an example arrangement for splitting a data object that contains video data.

DETAILED DESCRIPTION

Embodiments of the improved technique will now be described. One should appreciate that such embodiments are provided by way of example to illustrate certain features and principles but are not intended to be limiting.

An improved technique for managing data objects in a storage cluster includes splitting a data object into multiple portions at boundaries within the data object. The technique further includes transforming the portions of the data object into segments that provide individually processable units, and distributing the segments among multiple computing nodes of the storage cluster for storage therein.

This application discloses multiple embodiments. One embodiment is directed to splitting a data object into portions for distributed storage in the storage cluster. Another embodiment is directed to performing a distributed processing task by the storage cluster. Yet another embodiment is directed to protecting data of a data object stored in a storage cluster. These embodiments may be realized as respective aspects of a single system, as shown and described in the examples that follow. Alternatively, embodiments may be practiced independently, such that an implementation supporting any one of the embodiments need not also support the other embodiments.

Figure 1:
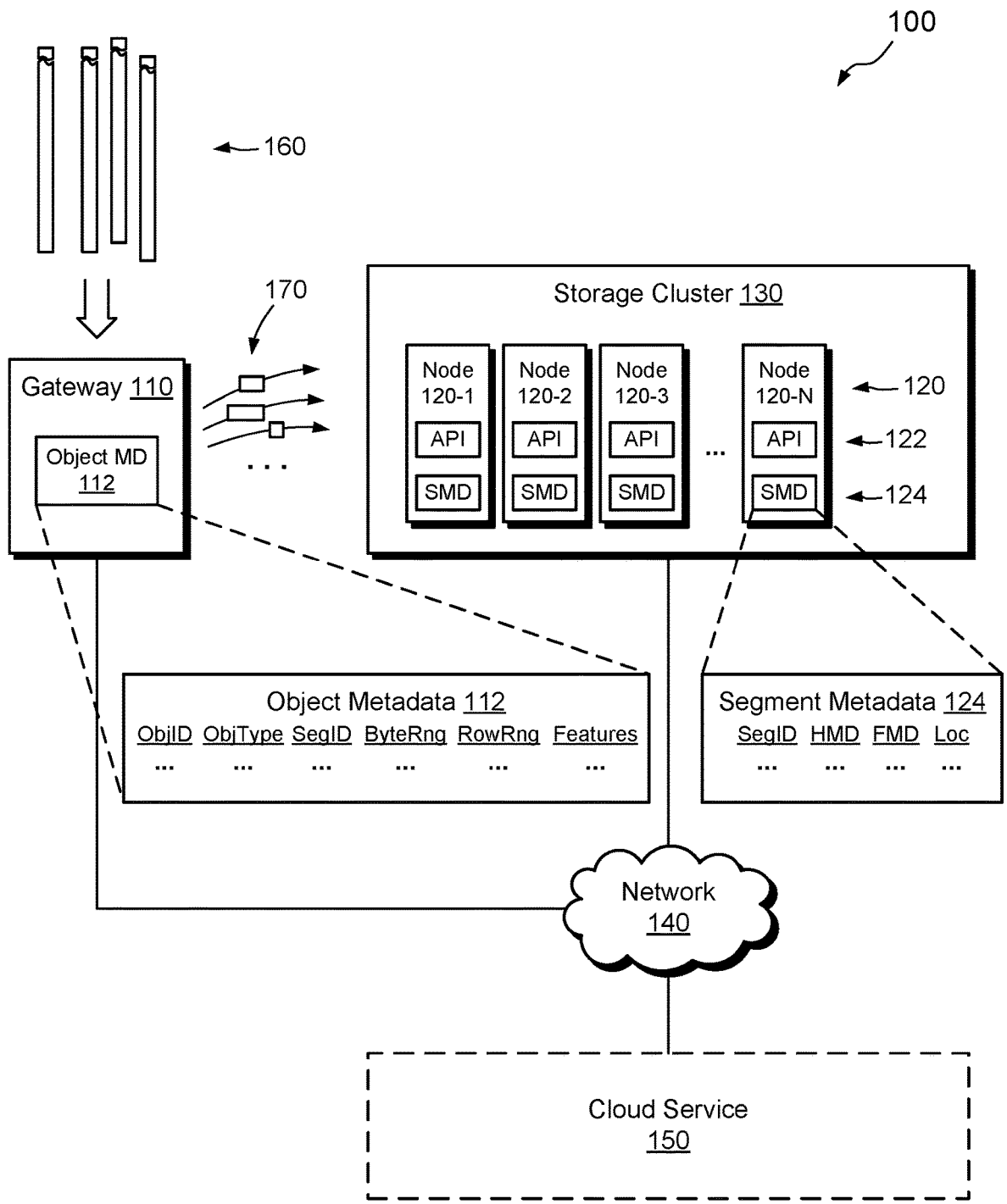
FIG. 1 is a block diagram of an example environment in which embodiments of the improved technique can be practiced.

FIG. 1 shows an example environment 100 in which embodiments of the improved technique can be practiced. As shown, a gateway 110 is configured to access multiple computing nodes 120 of a storage cluster 130 over a network 140 and to act as an interface between the storage cluster 130 and clients/users. The network 140 may include a local area network (LAN), a wide area network (WAN), the Internet, or any other type of network or combination of networks that supports digital communication between computers. The gateway 110 may be a computer or other computing device (e.g., server, workstation, tablet, smartphone, personal data assistant, gaming console, set-top box, or the like), which may include its own network interface, processor, and memory. In some examples, the gateway 110 may be provided as a computing node 120 of the storage cluster 130. Multiple computing nodes 120 (also referred to herein as "nodes") 120-1 through 120-N are shown, with the understanding that the storage cluster 130 may include a large number of nodes 120, such as hundreds or more. Each node 120 includes one or more processors and memory for running programs, as well as one or more network interfaces (e.g., network interface cards) and persistent storage, such as one or more solid-state drives (SSDs), magnetic disk drives, and/or the like. Nodes 120 of the storage cluster 130 may be interconnected via the network 140, or via a dedicated network (e.g., a separate local area network; not shown), or by other means. For purposes of this document, any network internal to the storage cluster 130 is considered herein to be part of the network 140.

Preferably, each node 120 has one or more high-speed connections to its respective persistent storage. For example, connections between nodes 120 and their storage devices (e.g., SSDs) may have bandwidths that exceed those of connections between nodes over network 140 by an order of magnitude or more.

In an example, the storage cluster 130 is configured as an object store, which may be compatible with commercially-available cloud-based object stores, such as AWS (Amazon Web Services) S3 (Simple Storage Service), Microsoft Azure Data Lake, and/or Google Cloud Storage. In a particular example, the storage cluster 130 is configured as an S3-compatible object store. To this end, each node 120 may include an API (application program interface) 122 that enables the node 120 to participate as a member of the object store.

The cluster 130 may be implemented in a data center, which may occupy a room or multiple rooms of a building, in which the nodes 120 are networked together. Other implementations may span multiple buildings, and metro-cluster arrangements are feasible.

In other examples, the storage cluster 130 may be implemented within a cloud service 150, e.g., using physical or virtual machines provided therein. For instance, the entire storage cluster 130 may be disposed entirely within the cloud service 150.

As yet another example, the cloud service 150 may act as a primary repository of data, with the storage cluster 130 acting as a cache for the cloud service 150. The storage cluster 130 may thus store commonly accessed data but typically not all data available from the cloud service 150.

Implementations may be suitable for individuals, small organizations, and/or enterprises, and may be delivered according to a SaaS (software as a service) model or according to other models. Embodiments are particularly suitable for managing large data objects, which may have sizes in the hundred-megabyte range or above. This feature makes embodiments a good match for big data applications, such as those involving data lakes. One should appreciate, though, that embodiments are not limited to any particular users, service model, data size, or application.

In example operation, gateway 110 (which may be part of the storage cluster 130 or separate therefrom) accesses one or more data objects 160 to be managed by the storage cluster 130. The data objects 160 may reside in the cloud service 150, e.g., within buckets or blobs, or they may be provided by one or more separate sources. For example, data objects 160 may be generated by real-time activities, such as industrial or scientific processes which may produce the data objects 160 as data logs or other records of ongoing activities. The data objects 160 may be presented as files, streams, memory ranges, or in any other manner.

The data objects 160 may be structured in accordance with particular object types. For example, data objects 160 may be provided as tabular objects such as CSV (comma-separated values) or log files, as tree-based objects such as JSON (JavaScript Object Notation) or XML (extensible markup language) documents, as column-oriented objects such as Apache Parquet files, as video files or streams, as audio files or streams, or as collections of pictures, for example. Although certain types of data are particularly shown and/or described, one should appreciate that embodiments are intended to encompass any type of data, with the ones shown and/or described merely providing concrete examples used to illustrate operating principles.

To initiate management of a data object 160, gateway 110 may scan the data object, e.g., starting from the beginning of the data object and proceeding forward. Normally, the gateway 110 may be oblivious to the data object's type when it first accesses the object and may perform an initial scan of the object 160 to identify its type. The scan may involve sampling a set of regions of the data object, typically at the beginning of the object, and searching for sequences or characters that are specific to particular object types. For instance, CSV and log files typically use NewLine characters to denote ends of records, and may use commas, spaces, or other characters to separate adjacent fields. Some data objects may include headers that directly identify the type of object. For example, Parquet files start with a 4-byte header that designates a so-called "magic number," which provides the code "PAR1" to identify the file as a Parquet file. Most file types provide clear indications that enable them to be identified without much effort. Some types may be harder to identify. Should one wish to recognize such less-easily identifiable types, more advanced algorithms may be applied, which may include machine learning or other types of artificial intelligence.

Once the gateway 110 has identified the type of the data object 160, the gateway 110 may proceed to start splitting the data object 160 into portions. For example, gateway 110 may search for boundaries in the data object that provide separators between adjacent processable units of the data object. The exact nature of the boundaries may vary from one object type to another. For example, CSV files may use NewLine characters to identify boundaries, whereas video files or streams may use I-frames (intra-coded pictures). Some object types specify boundaries using embedded metadata. For instance, Parquet files contain footers that identify boundaries between adjacent row groups.

The "processable units" of a data object are regions which are amenable to independent processing, in the sense that they contain few if any dependencies on other processable units. Splitting a data object into processable units thus promotes efficient parallel processing by nodes 120 of the storage cluster 130.

Although splitting is a first step in promoting independent processing of split-off portions, it is not always sufficient for optimal performance. For example, split-off portions may lack certain metadata (e.g., headers, footers, or other content) that cause them to retain dependencies on other parts of the data object 160. Thus, the gateway 110 preferably performs an additional step of transforming the split-off portions into segments 170. In an example, the transformed segments 170 can be processed as if they were complete, self-contained objects of the same type as the data object 160.

The segments 170 are similar to the portions from which they were created, but they are adjusted to reduce or eliminate dependencies on other portions. For example, if the first portion of a CSV file contains a header but subsequent portions do not, then the gateway 110 may copy the header of the first portion to each of the segments 170 that are formed from the subsequent portions. In this manner, each segment 170 has its own header and can be processed as if it were an independent CSV file. Corresponding adjustments may be performed for other object types, with the particulars of the adjustments depending on the object type. Various examples are provided below.

With the segments 170 thus formed as independently-processable units of the same type as the data object 160, gateway 110 may distribute the segments 170 to various nodes 120 of the storage cluster 130, which nodes 120 store the segments therein, e.g., in persistent storage locally connected to the respective nodes 120. To keep track of segment locations, gateway 110 may update object metadata 112.

As shown in an expanded view of FIG. 1, object metadata 112 includes object-specific information that facilitates operation of the storage cluster 130. Such object metadata 112 may include the following elements, for example:

ObjID. An object identifier, which is preferably unique within a namespace of the storage cluster 130.

ObjType. A determined type of the data object 160, such as CSV, JSON, XML, Parquet, etc.

SegID. An identifier of a segment 170 created from a portion of the object. Preferably unique within the namespace of the storage cluster 130.

ByteRng. A range of bytes of the data object 160 included in the current segment. May be expressed as a value-pair that specifies a start byte position and an end byte position (or as a start byte position and a length).

RowRng. A range of rows of the data object 160 included in the current segment. Relevant to tabular data and other types of data provided in rows.

Features. Features detected in segments that may be relevant to later processing. May be provided on a per-segment basis.

Although shown as a single-level structure, object metadata 112 may be arranged in any suitable manner, which may include a hierarchical structure. Also, the scope of object metadata 112 is not limited to the examples provided. Indeed, object metadata 112 may store any information that facilitates operation of the storage cluster 130 or processing tasks that may be performed therein.

In some examples, object metadata 112 is stored redundantly to promote reliability. For instance, object metadata 112 may be stored on multiple nodes 120 of the storage cluster 130, e.g., using a multi-way mirror and/or other RAID (Redundant Array of Independent Disks) or erasure-coding techniques. Also, activities attributed herein to the gateway 110 may be performed by any number of computers, and such computers may include nodes 120 of the storage cluster 130. For example, a particular node of the storage cluster 130 may be designated as a load balancer and may take the workload of nodes 120 into account when segments 170 are distributed among nodes of the cluster.

As still further shown in FIG. 1, computing nodes 120 may store segment metadata 124, which describes the segments 170 stored by the respective nodes 120. Examples of segment metadata 124 may include the following elements:

SegID. The unique identifier of a segment stored on the computing node 120.

HMD. Header metadata that forms part of the segment stored on the computing node 120. May be a copy of header metadata, originally found in another segment derived from the same object, which is included with the current segment to promote independent processing of the current segment.

FMD. Footer metadata that forms part of the segment stored on the computing node 120. May be a copy of footer metadata, originally found in another segment derived from the same object, which is included with the current segment to promote independent processing of the current segment.

Loc. A location at which the node 120 may access the current segment. Expressed in any suitable manner, such as by disk drive and logical block address (LBA), as a volume, as a file, as an aggregate, or in any other manner used by the node 120 in addressing its data.

As with object metadata 112, segment metadata 124 may also be stored redundantly to promote reliability. In some examples, nodes 120 may store segment metadata 124 along with the segments 170 that the metadata describe. For example, segment metadata for segment A may be stored with Segment A. Likewise, segment metadata for segment B may be stored with Segment B. Segment metadata 124 may then be protected in the same ways that the segments 170 themselves are protected. Various examples of segment protection are described hereinbelow.

Figure 2:
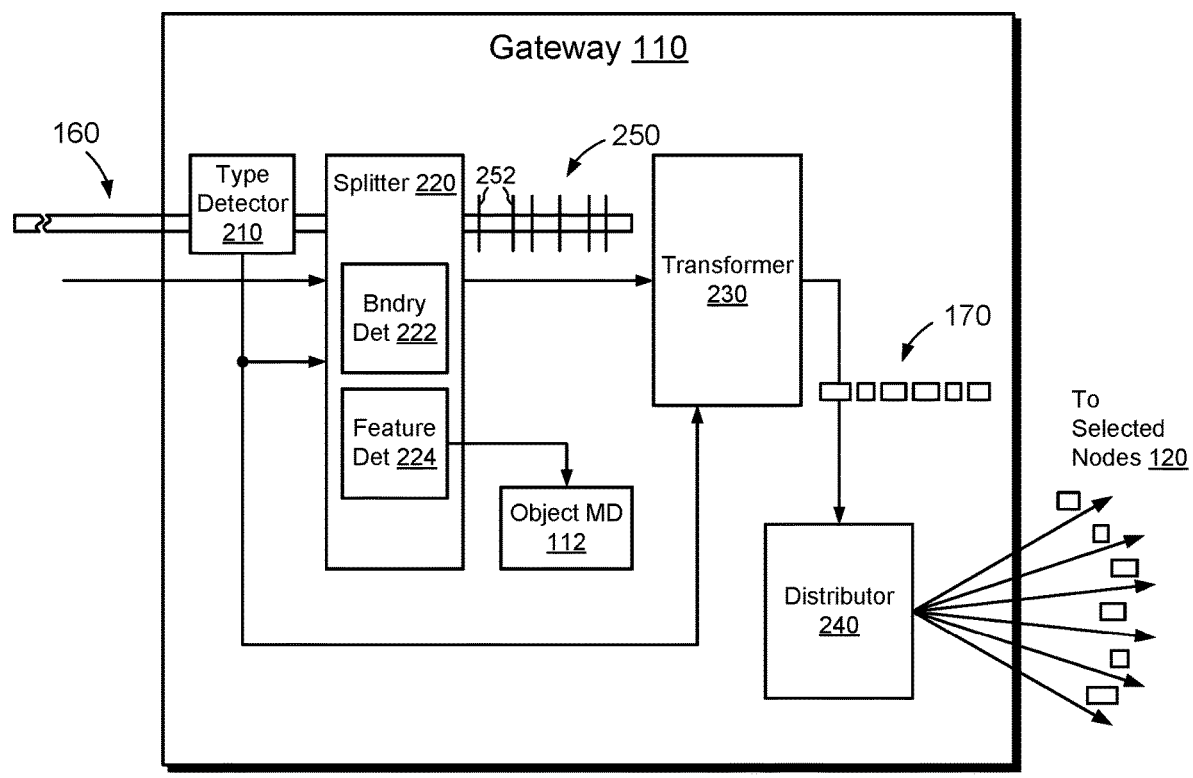
FIG. 2 is a block diagram that shows example features of a gateway device of FIG. 1 in additional detail.

FIG. 2 shows example features of the gateway 110 in additional detail. For this example, it is assumed that the gateway 110 performs the indicated functions itself. As stated previously, some of the functions may be performed by other computers, including computing nodes 120 of the cluster 130.

As shown, the gateway 110 includes a type detector 210, a splitter 220, a transformer 230, and a distributer 240. The type detector 210 performs the function of reading a set of regions of a data object 160, e.g., by sampling bytes at the beginning of the object, and identifying the object type of the data object 160 based on the sampling. The type detector 210 may inform the splitter 220 and the transformer 230 of the determined object type.

Splitter 220 performs the function of splitting the data object 160 into portions 250. The portions 250 include respective processable units of the data object 160 and are defined by boundaries 252 in the data object. A boundary detector 222 of the splitter 220 scans the data object 160 for boundaries 252, i.e., separators between the processable units, and notes the locations of the boundaries 252 relative to the data object 160 (e.g., based on byte locations). As mentioned earlier, the nature of the boundaries 252 depends upon the object type of the data object 160, which is preferably known based on operation of the type detector 210.

In some examples, such as when splitting Parquet files, the boundary detector 222 may identify every boundary 252 in the data object 160 and define a new portion 250 between each pair of boundaries. Detecting every boundary works well for Parquet files, where boundaries 252 are based on row groups, which tend to be large (e.g., in the megabyte range). If a row group is found to be unusually small, however, then a boundary may be skipped, such that multiple row groups may be included within a single portion 250. In other examples, such as when splitting CSV files, boundary detector 222 does not mark every single boundary of the data object 160, as doing so would produce an undesirably large number of small portions 250. In such cases, boundary detector 222 may wait to start detecting boundaries 252 when scanning a current portion 250 until the scanned size of the portion 250 exceeds some desired target size. Once the scan passes the target size, the boundary detector 222 may start detecting boundaries, preferably identifying the first boundary that the object contains beyond the target size. The current portion may thus end and a new portion may begin at the first detected boundary.

As the boundary detector 222 scans the object 160 for boundaries 252, a feature detector 224 may scan the object for additional features that may provide helpful information relevant to later processing. It is recognized that certain processing tasks run faster if it is known in advance that certain content is present or absent. As a particular example, certain queries of CSV files run more quickly if it is known in advance that there are no quotation marks in the data. Feature detector 224 may thus check CSV files for the presence or absence of quotation marks and update the object metadata 112 ("Features") accordingly.

With portions 250 of the data object 160 identified based on boundaries 252, transformer 230 transforms the portions 250 into respective segments 170. For example, transformer 230 modifies at least some of the portions 250 by adding metadata found in some portions to one or more other portions, so as to make such portions more amenable to independent processing, i.e., by removing dependencies between portions 250. The nature of the adjustments depends on the object type, which is known based on operation of the type detector 210. The results of operation of transformer 230 are segments 170, which provide individually processable units of the data object. For example, each of the segments 170 is rendered as the same object type as the data object 160. The segments 170 can thus be processed the same way that data objects can be processed, with the primary difference being that segments 170 are much smaller and more easily handled.

Distributor 240 then distributes the segments 170 to selected nodes 120 of the storage cluster 130 for storage in such nodes. At this time, gateway 110 updates object metadata 112 to record the locations to which the segments 170 are sent, e.g., the identities of particular nodes 120. In the manner described, the data object 160 is thus split, transformed, and distributed among nodes 120 of the storage cluster 130.

Figure 3A:
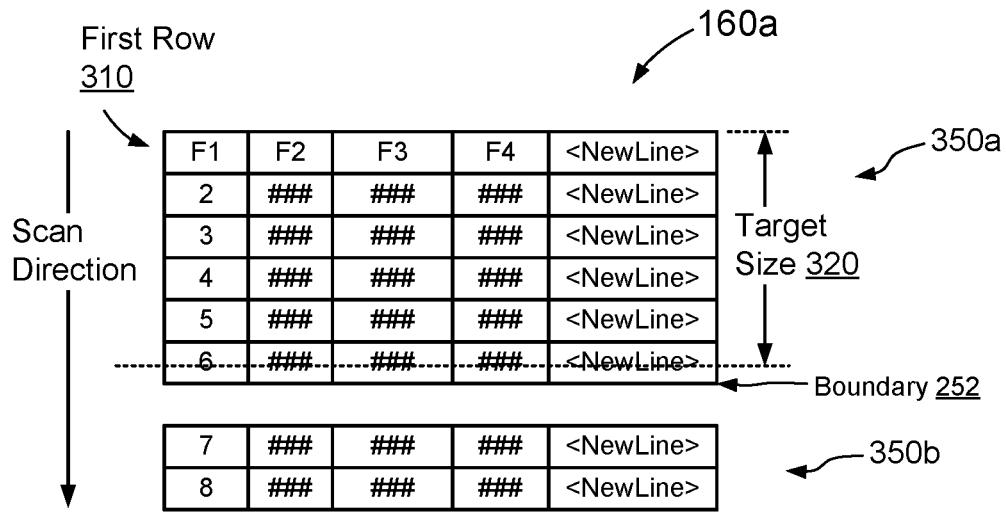
FIGS. 3A and 3B are block diagrams that show an example arrangement for splitting a data object that contains tabular data.
Figure 3B:
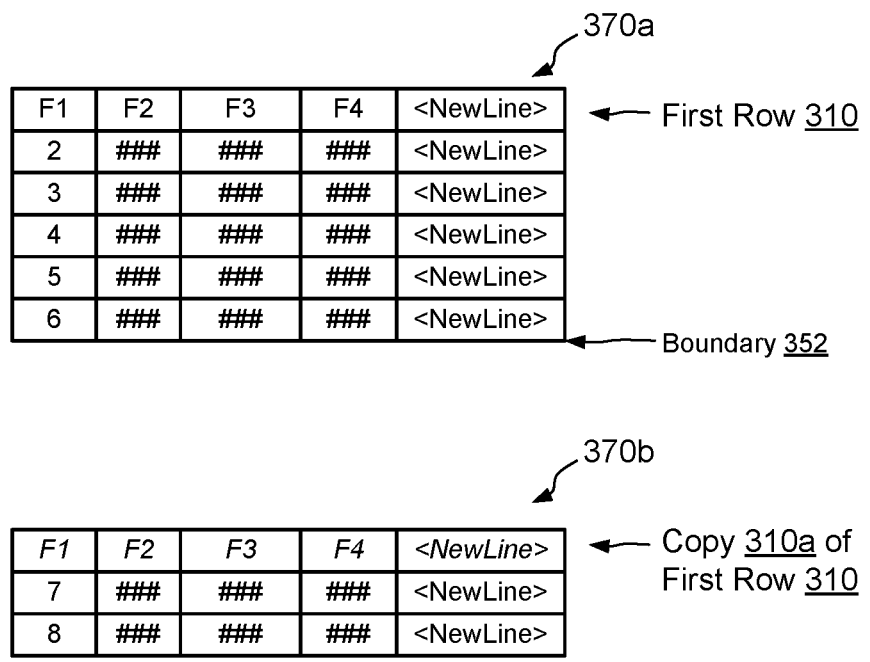

FIGS. 3A and 3B show an example arrangement for splitting and transforming a data object 160a that contains tabular data, such as a CSV file. FIG. 3A shows example results of splitting, and FIG. 3B shows example results of transforming.

As shown in FIG. 3A, the data object 160a has a first row 310 and additional rows, labeled 2 through 8 (see column 1). The data object 160a has four columns. Each row ends in a <NewLine> character, which acts as row delimiter in CSV.

When splitting the data object 160a, the splitter 220 may apply a target size 320, which defines a minimum size for portions 350 of the data object 160a. For example, the splitter 220 may identify a location (shown as a dotted line) along the data object 160a that corresponds to the target size 320, and then split the data object 160a at the first boundary that follows the identified location. In the example shown, the splitter 220 detects the NewLine character at the end of the sixth row as a first boundary 252 following the target size 320, and splits the object 160a at this location. As a result, the first six rows of object 160a form a first portion 350a, and the next two rows form the first two rows of a second portion 350b. Additional rows may be added to the second portion 350b as the splitter 220 continues to scan the object 160a.

Even though the splitter 220 has successfully separated the object 160a at a row boundary (thus avoiding having different parts of the same row assigned to different portions 350), the result of splitting may still be inefficient. For example, if the first row 310 of object 160a is a header row (e.g., a row that contains text indicating column names), then the second portion 350b would lack that header and its later processing might be compromised. For example, the header may be required for responding to certain queries or other activities. This deficiency may be addressed by transformer 230, however.

FIG. 3B shows example results of modifications made by transformer 230. Here, the portions 350a and 350b are now rendered as segments 370a and 370b, respectively. Segment 370b has been modified by insertion of a first row 310a, which is a copy of the first row 310 found in the first segment 370a. The addition of the first row 310a effectively transforms the second portion 370b into an independent processable unit. One should appreciate that the change made in segment 370b may be repeated in other segments 370 created for object 160a, such that all segments 370 are made to have the same first row 310 as that of the first segment 370a. All such segments 370 are thus made to be independently processable.

It is noted that some CSV files do not use header rows, such that the first row 310 may contain data, rather than text-based field names. In such cases, replication of the first row 310 of the first segment 370a to other segments 370 of object 160a may merely propagate redundant data. Such cases can be handled easily, however. For instance, queries or other processing tasks (e.g., arriving from clients of the storage cluster) may specify whether the CSV file represented by object 160a contains a header. If it does, then no change needs to be made, as copying the header was proper. But if the task specifies that the CSV file contains no header, then the copying turns out to have been unnecessary. In such cases, the nodes 120 that perform the distributed processing task on the CSV file may be directed simply to ignore the first row of all but the first segment 370a of segments 370. Little will have been lost as a result of copying the first row 310, which is typically negligible in size compared with that of a segment 370.

Figure 4A:
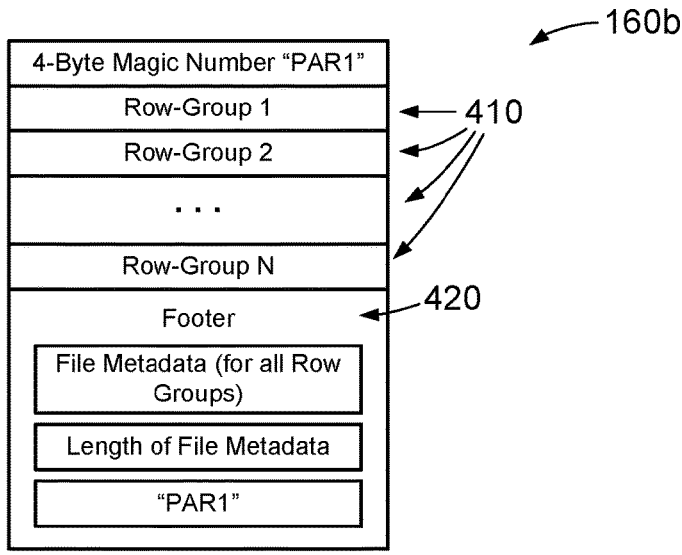
FIGS. 4A and 4B are block diagrams that show an example arrangement for splitting a data object that contains a Parquet file.
Figure 4B:
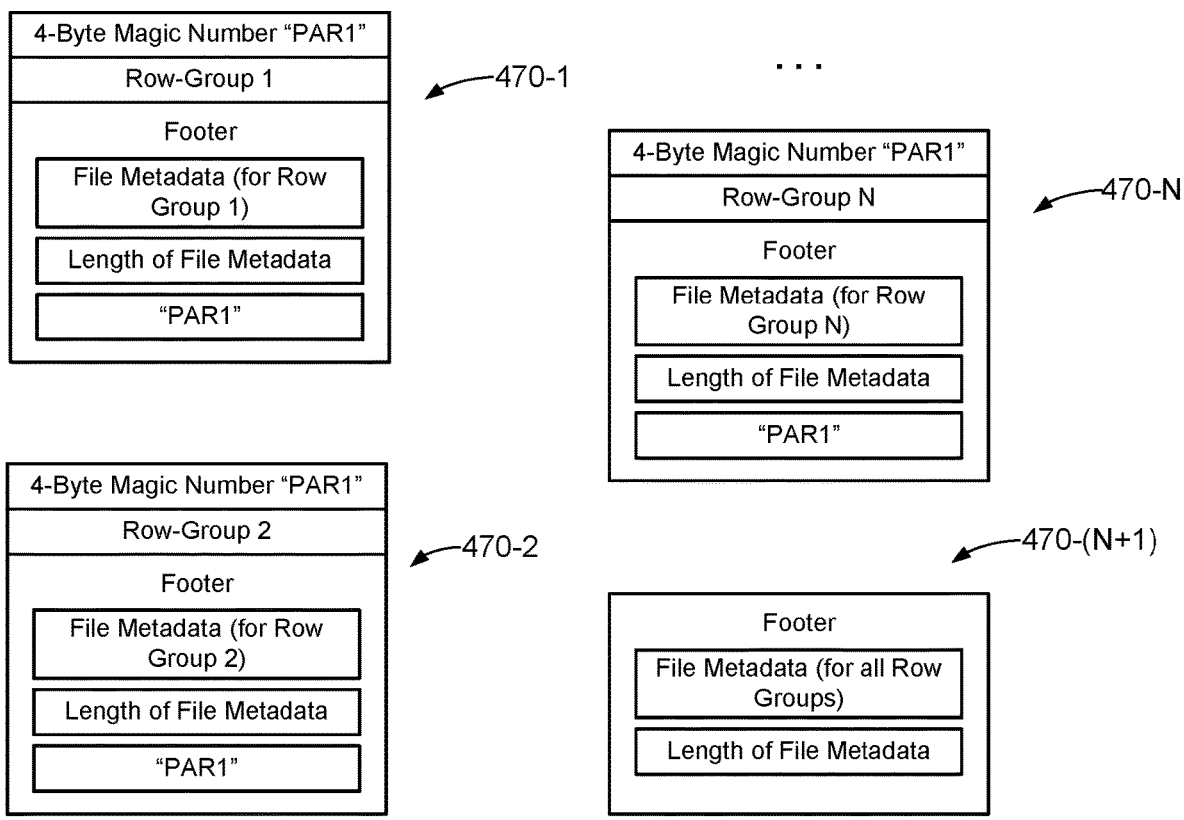

FIGS. 4A and 4B show an example arrangement for splitting and transforming a data object 160b that contains column-based data, such as a Parquet file. FIG. 4A shows an example Parquet file structure prior to splitting and transforming, and FIG. 4B shows example results after splitting and transforming.

As seen in FIG. 4A, the Parquet file 160b starts and ends with a 4-byte "Magic Number" ("PAR1"), as described above. The file 160b further includes multiple row groups 410 (1 through N, where "N" is any positive integer), and a footer 420. The row groups 410 are large structures, typically on the order of megabytes each. The footer 420 contains file metadata, which includes row-group metadata that provides locations of the row groups 410 (e.g., byte locations) within the file 160b. The footer 420 also includes a 4-byte data element that encodes the "Length of File Metadata."

Unlike the CSV example, where boundaries 252 may be detected directly while scanning forward through an object, boundaries between row groups 410 can be detected easily only by reading the footer 420. This means that splitter 220 typically makes a pass through the entire file 160a before reaching the footer 420, and then splits retrospectively. Splitting is generally performed at every row-group boundary, such that each portion 260 of the Parquet file 160b is made to contain a single row group 410. Given that row groups 410 may vary in size based on content, it may occasionally be worthwhile to place two or more row groups 410 into a single portion 260. This is a matter of design preference.

As shown in FIG. 4B, the Parquet file 160b of FIG. 4A has been rendered as N different segments 470 (470-1 through 470-N), with each segment containing a single row group. For example, segment 470-1 contains Row-Group 1, segment 470-2 contains Row-Group 2, and so on, up to segment 470-N, which contains Row-Group N.

The modifications shown in FIG. 4B, which may be implemented by transformer 230, render each row group as a self-contained Parquet file. For example, each of the segments 470-1 through 470-N contains the magic number "PAR1" at the beginning and at the end. Also, each of the segments 470-1 through 470-N contains a modified footer, which may be a modified version of footer 420. The footer in each segment 470 is prepared so that its row-group metadata is limited to only the row group (or row groups) contained in that segment, and to exclude row-group metadata for any row groups not contained in that segment. In addition, a "Length of File Metadata" is provided for each segment to reflect the actual length of the file metadata in the respective segment. Each segment 470-1 through 470-N thus presents itself as a complete Parquet file, which is amenable to independent processing just as any Parquet file would be.

In some examples, an additional segment 470-(N+1) may be provided as a final segment of the Parquet file 160b. Segment 470-(N+1) contains no row groups but rather provides a persisted version of parts of the original footer 420 of file 160b, i.e., the "File Metadata (for all Row Groups)" and the "Length of File Metadata." This segment is provided for reference and may be useful for speeding up certain processing tasks, but it is not intended to be treated as a self-contained Parquet file. Nor is it intended to be used as a source of data when performing queries.

FIGS. 5A and 5B show an example arrangement for splitting and transforming a data object 160c that contains video data, such as a video file or stream. FIG. 5A shows an example sequence of video frames prior to splitting and transforming, and FIG. 5B shows example results after splitting and transforming.

As seen in FIG. 5A, the data object 160c includes a sequence of frames 510, which in the depicted example include one or more I-frames (e.g., 510-1 and 510c), one or more P-frames (e.g., 510-2, 510-3, 510a, 510d, and 510e), and one or more B-frames (e.g., 510*b*). As is known, an I-frame is a video frame that contains a complete picture, relying upon no other frame for completeness. In contrast, P-frames and B-frames are incomplete and rely on other frames for completeness. P-frames typically refer back to previous frames, whereas B-frames may refer forward or back. Typically, I-frames appear much less frequently than P-frames or B-frames, as I-frames are larger and more costly to store and transmit.

Splitting video data in object 160*c* works much like splitting CSV data in object 160*a* (FIGS. 3A and 3B). For example, splitter 220 may aim to produce portions 250 that have sizes equal to or slightly greater than a target size 320. Splitter 220 attempts to find the first boundary 252 in the data object that arises after passing the target size. For detecting boundaries in video data, splitter 220 may be configured to identify I-frames, which provide natural boundaries because they do not require references to earlier or later frames. In the example shown, splitter 220 identifies the next boundary beyond the target size 320 as I-frame 510*c*.

Splitting the video just before I-frame 510*c* creates a problem, however, as B-frame 510*b* references I-frame 510*c* and thus cannot be rendered without it. If splitter 220 were to split the video immediately after B-frame 510*b*, then a gap in the video would appear in the segment that contains B-frame 510*b*. That segment would thus be incomplete, as it would have a dependency on another segment.

FIG. 5B shows an example solution. Here, the object 160*c* as processed so far is rendered as two segments, 570*a* and 570*b*. To resolve the dependency, segment 570*a* is provided with a copy 510*cc* of I-frame 510*c*. The copy 510*cc* provides the necessary reference from B-frame 510*b* and avoids a dropped video frame when rendering segment 570*a*. Meanwhile, segment 570*b* retains I-frame 510*c* as its first frame, thus providing an independent baseline for starting segment 570*b*. Subsequent frames, e.g., 510*d* and 510*e*, may rely on I-frame 510*c* for completeness, but none of the subsequent frames refer to any frame prior to I-frame 510*c*. Thus, each of the segments 570*a* and 570*b* is rendered as an independently and individually-processable unit, with no dependencies on other segments for completeness.

Figure 6:
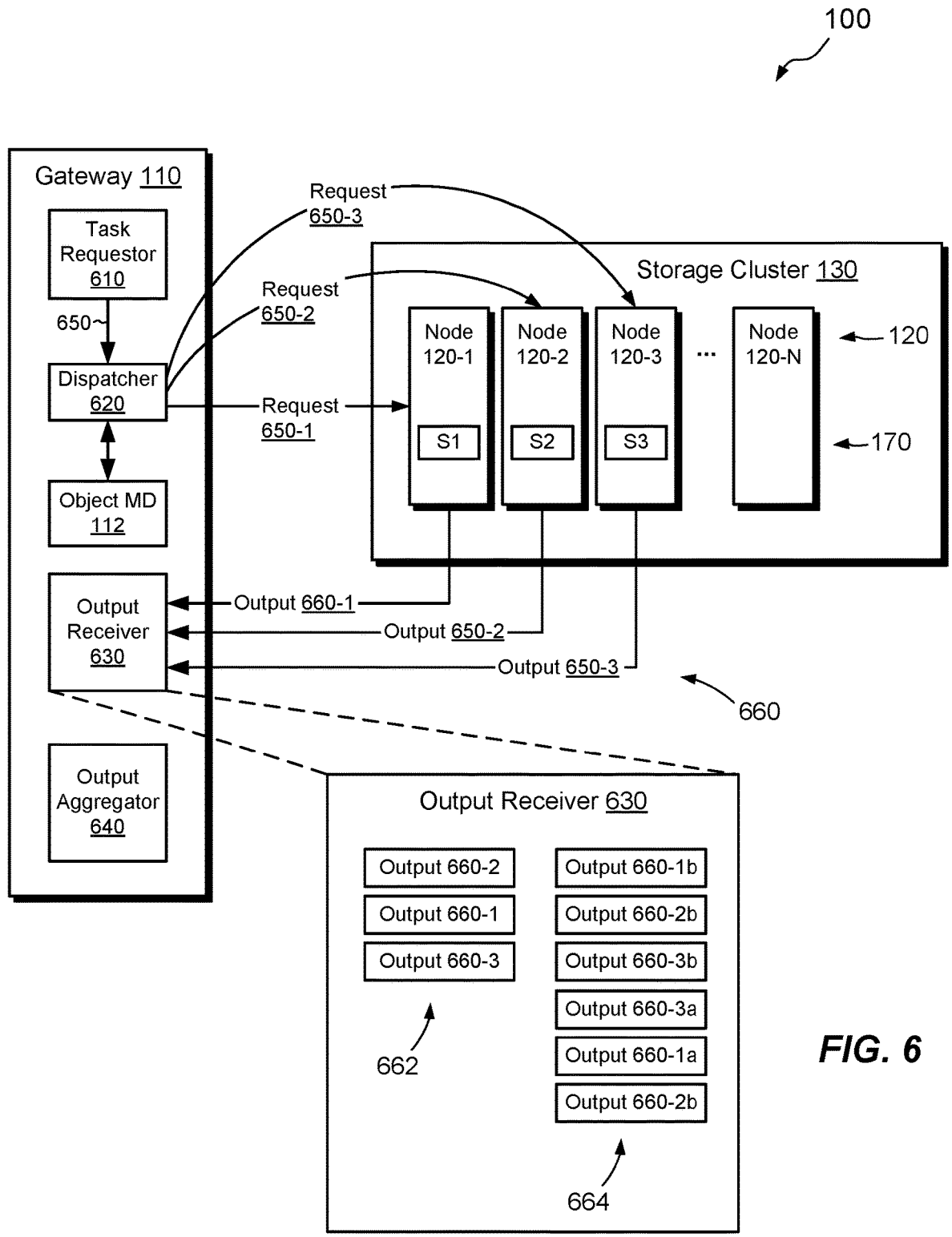
FIG. 6 is a block diagram showing an example arrangement for performing a distributed processing task in the environment of FIG. 1.

FIG. 6 shows an example arrangement for performing distributed processing in accordance with additional embodiments. The depicted arrangement may be implemented in the environment 100 of FIG. 1 or in other environments. The ensuing description assumes an implementation in the environment 100, such that the above-described features form parts of the instant embodiments. In other examples, the FIG. 6 arrangement may be implemented in other environments having different features. Therefore, the features described above should be regarded as illustrative examples but not as required unless specifically indicated.

As shown in FIG. 6, the gateway 110 includes components that support its role in performing distributed processing. These include a task requestor 610, a dispatcher 620, an output receiver 630, and an output aggregator 640, in addition to the above-described object metadata 112.

In example operation, the task requestor 610 initiates a request 650 for performing a processing task on a specified data object 160 (or set of objects 160). Various types of tasks are contemplated. These may include, for example, reads and/or queries of specified data (e.g., for tabular or tree-based data objects). Types of queries may include SQL (Simple Query Language) queries, key-value lookups, noSQL queries, and the like. Tasks for video data objects may include distributed video-processing tasks, such as searches for specified graphical content (e.g., faces, license plates, geographical features, and the like). Tasks for audio data objects may include searches for spoken words, voice characteristics (e.g., tone, accent, pitch, etc.), particular sounds, or the like. Essentially, any task that is amenable to splitting among multiple nodes 120 and involves access to potentially large amounts of data is a good candidate for processing in the arrangement of FIG. 6.

Upon issuance of the request 650, dispatcher 620 begins distributing components of the requested task to the respective nodes 120. For example, dispatcher 620 checks object metadata 112 to identify segments 170 of the specified data object 160 (or set of objects) and their respective locations in the storage cluster 130. In the simplified example shown, the object metadata 112 identifies three segments 170 (e.g., S1, S2, and S3), which make up the data object 160 (typical results may include tens or hundreds of segments) and three computing nodes 120-1, 120-2, and 120-3 that store the respective segments 170.

Dispatcher 620 then transmits requests 650-1, 650-2, and 650-3 to the identified nodes 120-1, 120-2, and 120-3, respectively. Requests 650-1, 650-2, and 650-3 may be similar or identical to request 650, e.g., they may provide the same query or other task as specified in request 650. Such requests 650-1, 650-2, and 650-3 need not be identical to one another, however. For example, some requests may include segment-specific metadata (e.g., stored in object metadata 112) that differs from that sent in other requests, and which may be used to guide a processing task on a particular node.

The identified nodes 120-1, 120-2, and 120-3 receive the requests 650-1, 650-2, and 650-3, respectively, and each of these nodes begins executing the requested task on its respective segment. For example, node 120-1 executes the task on segment S1, node 120-2 executes the task on segment S2, and node 120-3 executes the task on segment S3. In an example, each node 120 independently executes its respective task on its respective segment 170, without needing to contact any other node 120. For instance, node 120-1 completes its work by accessing only S1, without requiring access to S2 or S3. Likewise for the other nodes.

As the nodes 120-1, 120-2, and 120-3 perform their respective work, such nodes produce respective output 660, shown as output 660-1 from node 120-1, output 660-2 from node 120-2, and output 660-3 from node 120-3. The participating nodes send their respective output 660 back to the gateway 110, which collects the output in output receiver 630.

As shown in the expanded view near the bottom of FIG. 6, output receiver 630 may receive output 660 from participating nodes 120 in any order. In a first scenario, the nodes 120-1, 120-2, and 120-3 are configured to wait for their respective tasks to complete before sending back their output. In this case, the output 660 from a particular node may arrive all at once, with output from different nodes arriving at different times, based on their respective times of completion. Output data 662 shows example results according to this first scenario. Here, output 660-2 from node 120-2 arrives first and thus appears first in the output data 662, followed by output 660-1 (from node 120-1), and then by output 660-3, which arrives last (from node 120-3). Output 660 is thus interleaved in the output data 662.

In a second scenario, nodes 120-1, 120-2, and 120-3 are configured to return their output in increments, such as immediately upon such increments becoming available. In this second scenario, each participating node may return its output 660 in multiple transmissions, which may be spread out over time. Output data 664 shows example results according to this scenario. Here, output data 664 is seen to include six different batches (660-1*a*, 660-1*b*, 660-2*a*, 660-2*b*, 660-3*a*, and 660-3*b*), i.e., two batches of output from each of nodes 120-1, 120-2, and 120-3. The batches appear in output data 664 in the order received, which thus may be interleaved at finer granularity than was seen in the first scenario.

Of course, gateway 110 may sort the output 660 in any desired manner, and any node 120 of the storage cluster 130 may be called upon to perform this task. In some examples, both the affected nodes and the gateway 110 may participate in sorting the output 660. For example, each of the nodes may sort its respective output, such that each of the results 660-1, 660-2, or 660-3 arrives individually in sorted order. The gateway 110 may then complete the work, e.g., by employing the aggregator 640 for sorting among the sorted sets of returned results.

Sorting takes time, and many processing tasks value speed more highly than sorted output. To further promote high-speed operation, the computing nodes 120 may in some examples employ RDMA (remote direct memory access) when returning output 660 to the gateway 110.

For some processing tasks, dispatcher 620 may send processing requests to all involved nodes (i.e., to all nodes that store segments of the subject data object). In other examples, dispatcher 620 may limit the nodes to which requests are sent, e.g., based on knowledge of a priori segment contents, byte ranges of segments, or other factors. Limiting the number of involved nodes in this manner helps to reduce traffic over the network 140 (FIG. 1), further promoting efficiency.

Some processing tasks may involve aggregation. For example, a query may request a count of records that meet specified criteria, rather than the records themselves. A query may also request an average value, a maximum value, a minimum value, or some other aggregate value. Nodes 120 may perform certain aggregate functions themselves (e.g., count, total, max, min, etc.), but individual nodes 120 do not typically aggregate output across multiple nodes. Rather, this function may be performed by the data aggregator 640. For example, aggregator 640 may receive counts from multiple nodes, with each providing partial aggregate results derived from its processing on a respective segment. Aggregator 640 may then sum the counts from the responding nodes to produce an aggregate total for the entire data object 160. To produce an aggregated average for a data object, for example, aggregator 640 may direct each participating node to provide both a count and a total. It may then sum all counts returned to produce an aggregate count, sum all totals to produce an aggregate total, and then divide the aggregate total by the aggregate count to produce the desired aggregate average. Other types of aggregate functions may be performed in a similar way.

One should appreciate that the arrangement of FIG. 6 may perform aggregate queries at exceedingly low cost in terms of bandwidth. As each participating node computes a local aggregate and returns only its results, aggregate queries can run across very large datasets and produce very little output 660, which may normally be less than 1 kB and may often be as little as a few bytes.

Although the gateway 110 has been shown and described as the originator of task requests 650, as the dispatcher of requests to affected nodes, and as the collector of output 660 from the nodes, these functions may alternatively be performed by other computers, or by multiple computers. Indeed, they may be performed by one or more nodes 120 of the storage cluster 130. The example shown is thus intended to be illustrative rather than limiting.

Figure 7:
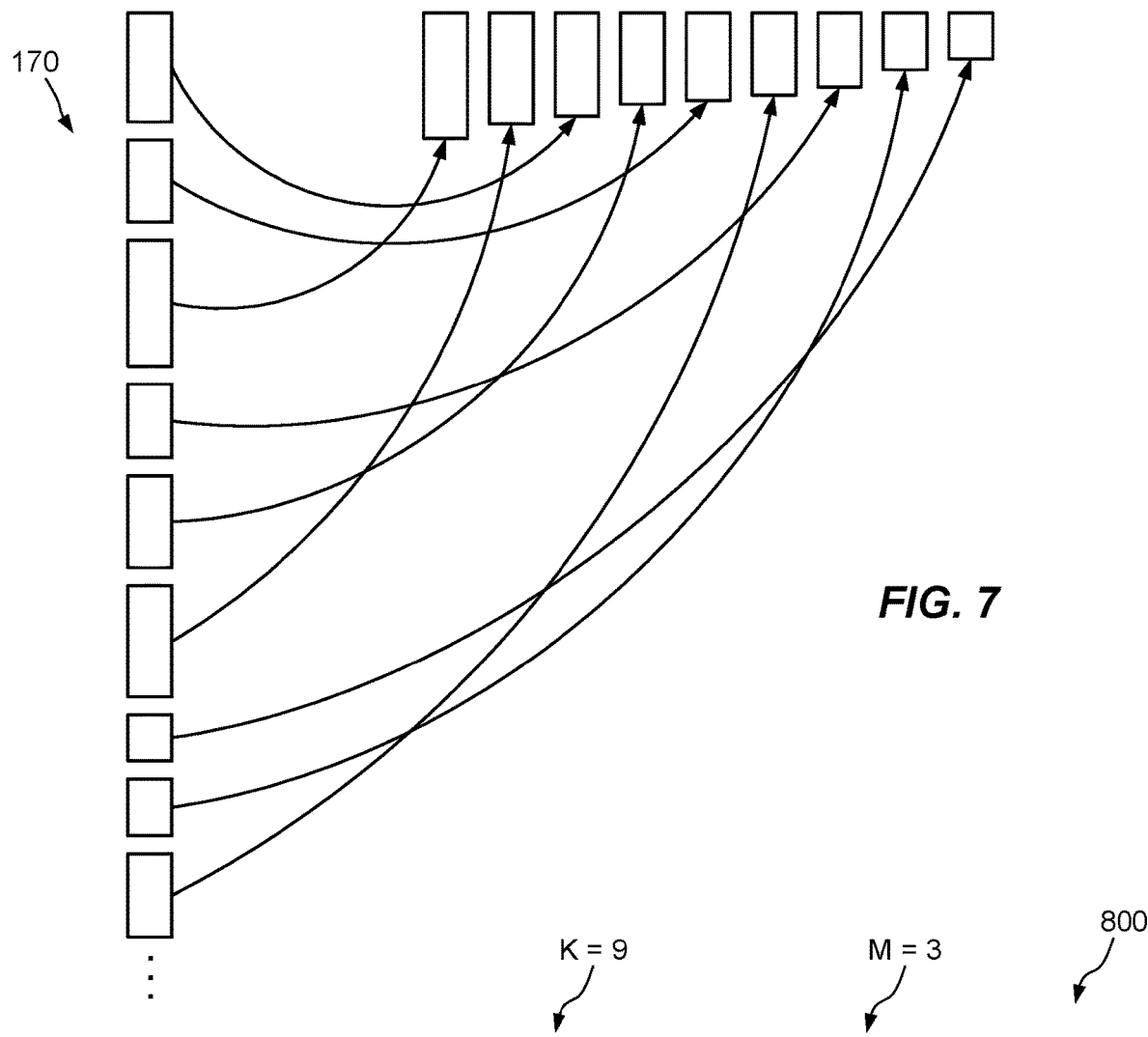
FIG. 7 is a block diagram showing an example arrangement of multiple segments of a data object in order of decreasing size.
Figure 8:
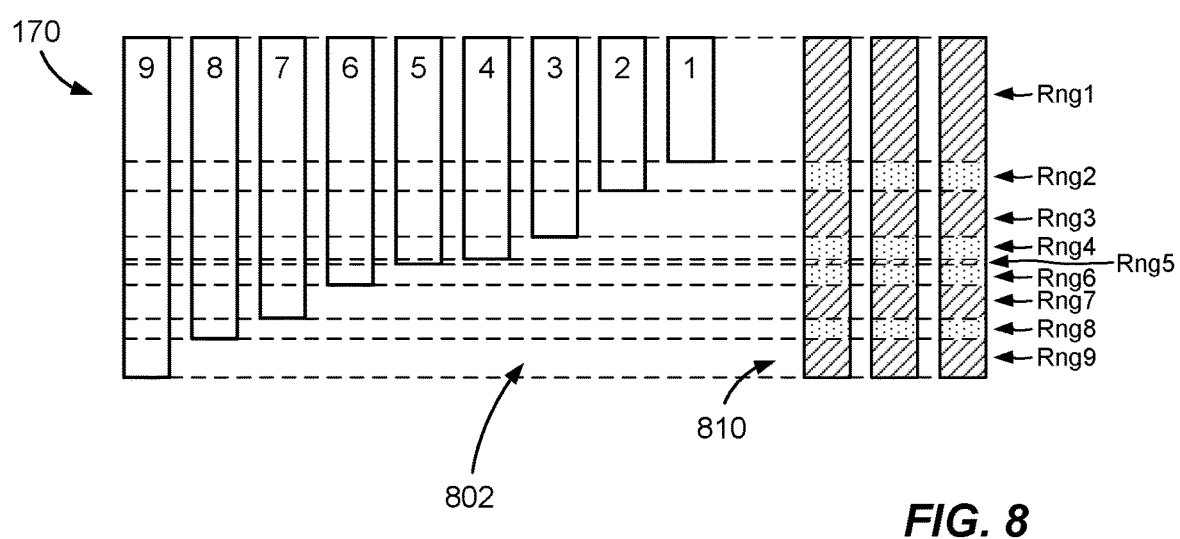
FIG. 8 is a block diagram showing an example arrangement for erasure coding the segments shown in FIG. 7.

FIGS. 7 and 8 show an example arrangement for performing data protection of segments 170 in accordance with additional embodiments. The depicted arrangement of FIGS. 6 and 7 may be implemented in the environment 100 of FIGS. 1 and/or 6 or in environments different from those illustrated above.

FIG. 7 shows multiple segments 170 that have been produced from a single data object 160, with the segments 170 arranged vertically. Although not required, the segments 170 may be arranged in order, in this case with the earliest-created segment (closest to the beginning of the object) appearing on top and with vertically adjacent segments 170 corresponding to adjacent portions of the data object 160. Nine (9) segments 170 are shown, with the understanding that many more than nine segments 170 may be produced from the data object 160. In an example, the depicted nine segments 170 are the first nine segments produced from the data object (e.g., by splitter 220 and transformer 230; FIG. 2).

Notably, the segments 170 have different respective lengths. It is thus possible to rank the segments 170 in order of length, e.g., from longest to shortest, as shown at the top-right of the figure.

FIG. 8 shows an enlarged view of the same ranked segments 170. Here, K+M erasure-code processing is performed on the nine segments (K=9) (e.g., by gateway 110) to generate M=3 elements 810 of repair data, which provide various forms of parity information. The K segments together with the M repair elements make up a repair group 802 that includes a total of 12 elements overall.

The depicted repair group 802 allows for damage to up to M elements prior to experiencing data loss. The damaged elements may be any elements of the repair group 802, which may include data segments 170 and/or repair elements 810, in any combination. Complete recovery and repair can be achieved as long as no greater than M total elements are damaged. One should appreciate that the choices of K=9 and M=3 may be varied, based upon a desired level of data protection, among other factors. In an example, repair elements 810 are generated using a computationally efficient procedure 800 that appears to be entirely new.

Prior erasure-coding schemes may require all K data elements to have equal length. If data elements have unequal lengths, then zero padding may be used to make the lengths equal. Parity calculations are then performed using the full length of all K data elements, producing M parity elements having the same length as the K data elements.

In contrast with the usual erasure-coding approach, the procedure 800 generates repair elements from data elements that have unequal lengths. No zero-padding is required. In an example, procedure 800 proceeds by logically aligning the segments 170, i.e., the K=9 data elements. For example, the segments 170 may be aligned at their respective tops, as shown. Alternatively, the segments 170 may be aligned at their respective bottoms (not shown) or may be aligned in some other known way. Note that such alignment is logical rather than physical, as no actual movement of any segment 170 is required. Also, the depicted ranking of segments 170 should be understood to be logical rather than physical.

With the segments 270 logically aligned, the procedure 800 proceeds by identifying the shortest segment 170 (labeled "1") and identifying a corresponding range (Rng1). Rng1 aligns with Segment 1 and has the same size and limits. As Segment 1 is the shortest segment and the segments 170 are logically aligned, all of the K segments 170 (Segments 1-9) have data within Rng1. Using the Rng1 data across Segments 1-9, the procedure computes M sets of repair data, one set for each of the M repair elements 810, and places the repair data in the respective repair elements 810 at the location of Rng1. Repair data for Rng1 is thus complete, and such repair data is based on all K segments 170. One should appreciate that the computations herein of repair data may be similar to what is used in conventional K+M erasure coding, the details of which are not critical to embodiments and are not described further.

The procedure 800 then continues in a similar manner for additional ranges. For example, Rng2 corresponds to the part of Segment 2 that extends beyond Segment 1, i.e., the part of Segment 2 for which no repair data has yet been computed. As Segment 1 has no data in Rng2, repair data for Rng2 may be computed using only the corresponding parts of Segments 2-9 (i.e., a total of K−1 segments). As before, the procedure computes M sets of repair data, one set for each of the M repair elements 810, and places the repair data in the respective repair elements 810, this time at the location of Rng2. Repair data for Rng2 is thus complete, but such repair data is based on only K−1 segments 170.

The procedure 800 may continue in this manner for each of ranges Rng3 through Rng8, with the computations of repair data for each range involving one fewer segment than do the computations for the immediately preceding range. Thus, the computations for Rng3 involve K−2 segments, the computations for Rng4 involve K−3 segments, and so on, with the computations for Rng8 involving only K−7 segments, i.e., Segments 8 and 9. It is noted that no computation is needed for Rng9, as Rng9 intersects only a single segment (Segment 9). Rather than computing repair data for Rng9, the procedure 800 instead stores replicas (copies) of the affected data, i.e., the portion of Segment 9 within Rng9. A separate copy of the Rng9 data may be provided at the Rng9 location of each of the repair elements 810.

The erasure-coding procedure 800 is typically faster to compute than conventional erasure coding. Instead of requiring all K data elements for computing repair data of M repair elements 810, the procedure 800 requires K data elements for only the shortest data element. For each next-shortest data element, the procedure 800 requires one fewer data element, eventually requiring only two data elements, and thus reduces computational complexity and execution time.

One should appreciate that segments 170 as produced from objects 160 may be protected using the erasure-coding procedure 800. For example, when distributing segments 170 to computing nodes 120 for storage in the cluster 130, gateway 110 (or some other computer) may perform the procedure 800 to generate repair elements 810 at reduced computational cost. The procedure 800 may operate with K segments 170 at a time, producing M repair elements for each, and forming respective repair groups 802 for each set of K+M elements.

Figure 9:
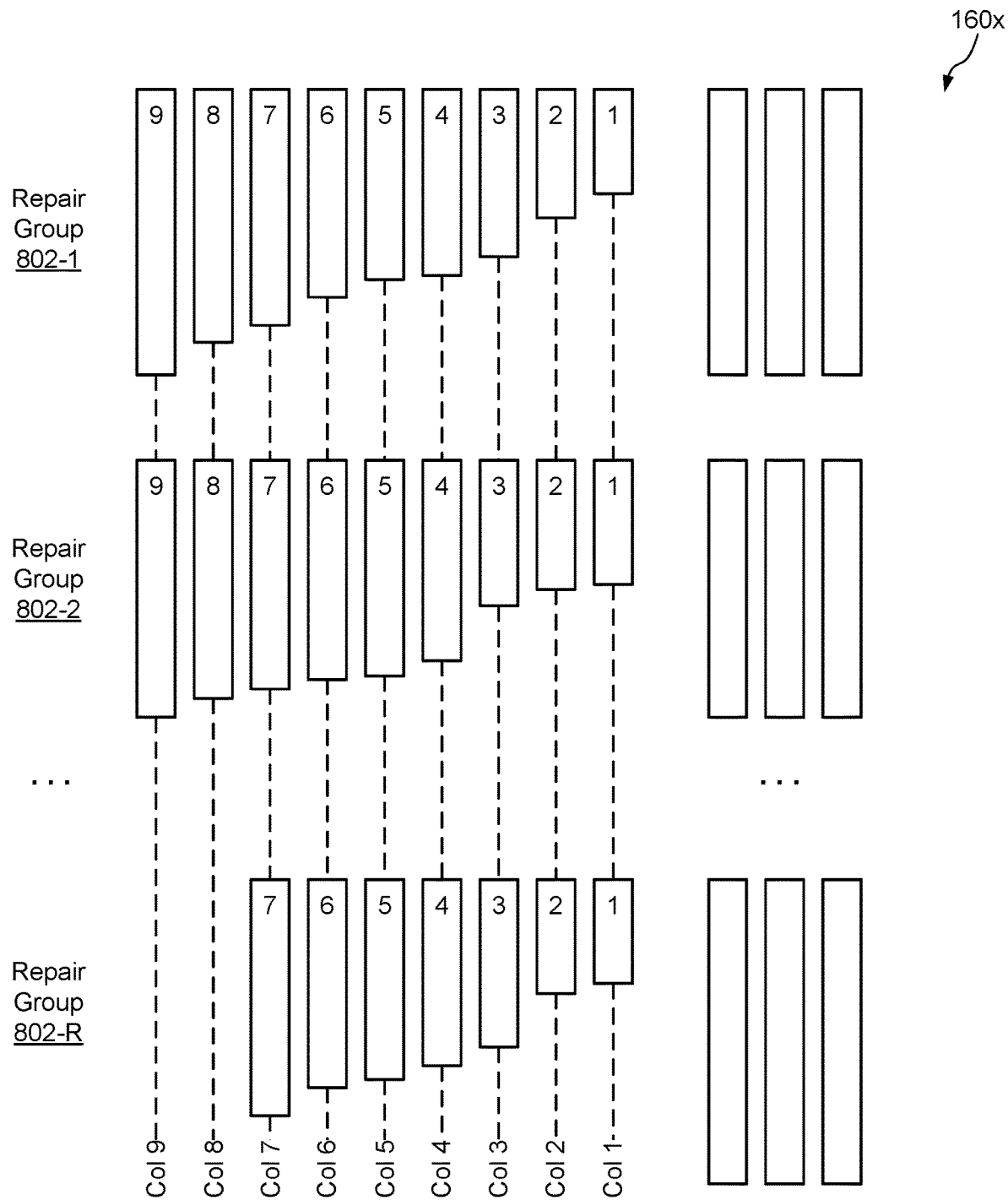
FIG. 9 is a block diagram showing multiple repair groups formed from segments created from a data object.

FIG. 9 shows an example arrangement of multiple repair groups 802, which may be used for protecting a particular data object 160x. As shown, repair groups 802-1, 802-2, and so forth up to 802-R, provide data protection for data object 160x, e.g., using the erasure-coding procedure 802. The first repair group 802-1 includes and protects a first group of K segments 170 produced from the data object 160x, the second repair group 802-2 includes and protects a second group of K segments 170 produced from the same data object 160x, and so on, up to the $R^{th}$ repair group 802-R, which protects a last group of segments 170. It is noted that repair group 802-R contains fewer than K segments. For example, the data object 160x may have ended (run out of data) after producing only seven segments. The segments 170 that make up the repair groups 802 are seen to be arranged in columns (Col 1 to Col 9), with each column corresponding to a respective one of the K elements.

It should be appreciated that erasure coding may place certain constraints on data placement. For example, no two segments 170 that belong to the same repair group 802 should normally be stored on the same disk drive (e.g., SSD, magnetic disk drive, etc.), as doing so would undermine the redundancy of the erasure coding and subject the segments to an increased risk of data loss. For similar reasons, no two segments 170 that belong to the same repair group 802 should normally be stored on the same computing node 120, as doing so would reduce redundancy, e.g., in the event of a failure of the computing node 120. These rules do not typically apply across different repair groups 802, however. For example, no substantial loss of redundancy results from storing segments 170 that belong to different repair groups 802 on the same computing node 120, as long as no two segments belong to the same repair group 802. For example, it may be permissible for a single computing node 120 to store one segment 170 from each of the R repair groups that protect a given data object 160 (a total of R segments of the same data object).

It should further be appreciated that erasure coding is but one way to protect data, with another way being replication. In an example, data objects 160 and their associated repair data and/or replicas reside in buckets of an object store, and data protection schemes are applied on a per-bucket basis. A bucket that uses replication for its data protection will thus use replication for protecting all of its contents, including all objects 160 contained therein. Likewise, a bucket that uses erasure coding for its data protection will use erasure coding for all of its contents. Erasure coding parameters K and M may also be selected and applied on a per-bucket basis. Thus, the arrangement in FIG. 9 may use erasure coding with K=9 and M=3 because the bucket that contains object 160x uses these settings, which are thus applied globally to all contents of the bucket.

Figure 10:
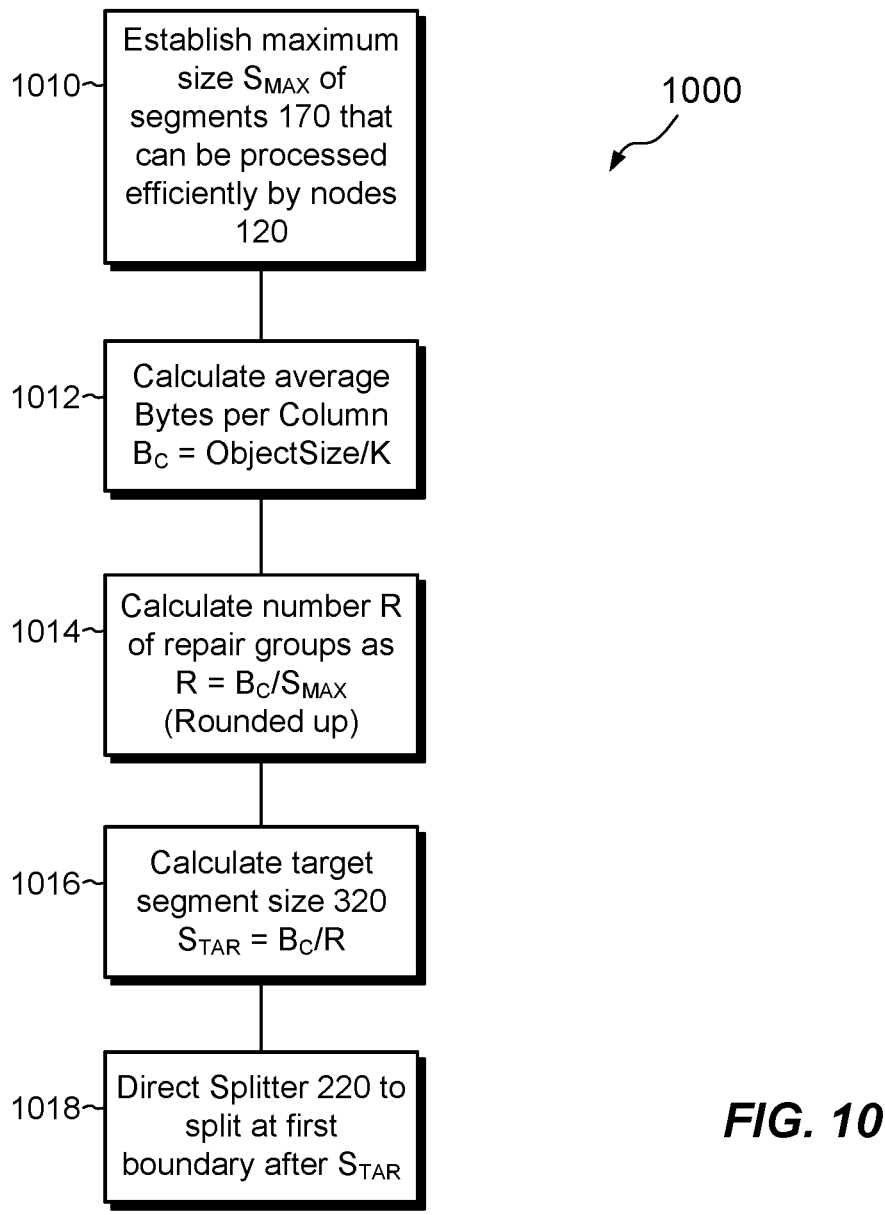
FIG. 10 is a flowchart showing an example method of determining a desired target size of segments.

FIG. 10 shows an example method 1000 for determining various quantities used in managing a data object 160 and its segments 170. The method 1000 assumes data protection using erasure coding, and may be used for determining a desired target size 320 of segments 170 (FIG. 3), as well as a number R of repair groups 802 to be used for protecting the data object 160 (FIG. 9). The method 1000 may be performed, for example, by the gateway 110, by a node 120 of the storage cluster 130, or by some other computer that can connect to the cluster 130. At the beginning of method 1000, the size of the data object 160 and the number K (as used in K+M erasure coding) are assumed to be known in advance.

At 1010, the method 1000 establishes a maximum size $S_{MAX}$ of segments 170 that can be processed efficiently by nodes 120. The maximum size may be based on practical considerations, such as hardware specifications of nodes 120 (e.g., clock speed, number of cores, amount of memory, and so forth), as well as expected latency to processing tasks and expectations of users. Typical ranges of $S_{MAX}$ may fall between several hundred kilobytes and several megabytes, for example.

At 1012, the method computes an average number of bytes per column, $B_C$. In an example, the value of $B_C$ may be based upon the size "ObjectSize" of the data object 160 and on the number K used in the K+M erasure coding used to protect the data object 160. For example, $B_C$=ObjectSize/

K. Referring briefly back to FIG. 9, it can be seen that $B_C$ represents the average amount of per-column data in a depicted column.

At 1014, the method 1000 calculates a number R of repair groups, e.g., by dividing $B_C$ by $S_{MAX}$ and rounding up to the nearest integer. More specifically, the number of repair groups may be calculated as $R=B_C/S_{MAX}$, rounded up.

At 1016, the method calculates the target segment size 320 as $S_{TAR}=B_C/R$. The resulting quantity $S_{TAR}$ may be provided to splitter 220, e.g., in determining where to start searching for boundaries 252 when splitting the data object 160.

At 1018, the method 1000 directs the splitter 220 to split the data object 160 in a way that produces portions 250 that are at least as large as $S_{TAR}$, e.g., to produce portions 250 that extend to the next boundary 252 beyond $S_{TAR}$.

Method 1000 thus provides useful guidelines for establishing the target segment size 320 and the number R of repair groups to be used for a particular data object 160. Actual selections of these quantities may involve the discretion of administrators and may be driven by other factors besides those described. Thus, the method 1000 is intended to be advisory rather than required.

Figure 11:
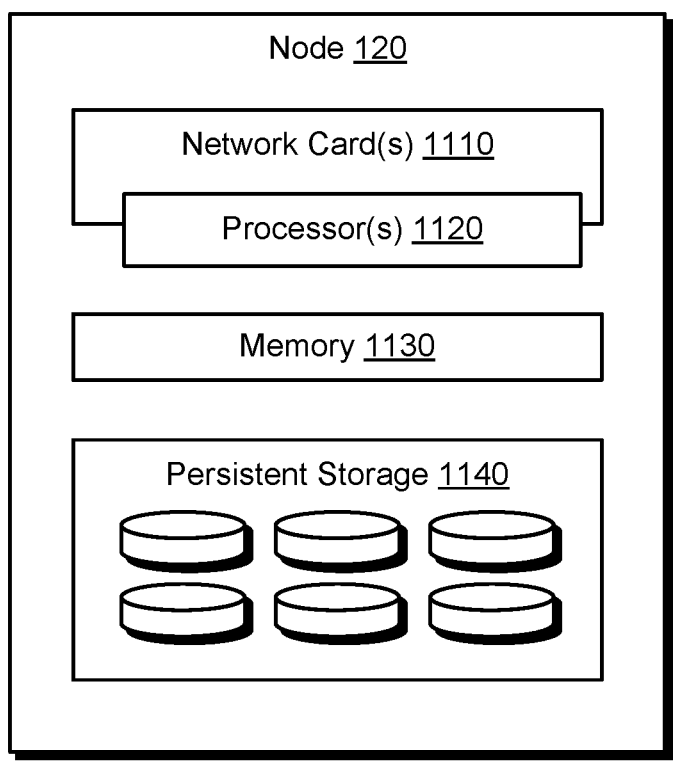
FIG. 11 is a block diagram of an example computing node that may be used in the environment of FIGS. 1 and 6.

FIG. 11 shows an example computing node 120 in additional detail. The computing node 120 is intended to be representative of the computing nodes 120-1, 120-2, and 120-3 of the storage cluster 130. It is also intended to be representative of the gateway 110 of FIG. 1.

As shown, computing node 120 includes one or more communication interfaces, such as one or more network interface cards (NICs) 1110, a set of processors 1120, such as one or more processing chips and/or assemblies, memory 1130, such as volatile memory for running software, and persistent storage 1140, such as one or more solid-state disks (SSDs), magnetic disk drives, or the like. The set of processors 1120 and the memory 1130 together form control circuitry, which is constructed and arranged to carry out various methods and functions as described herein. Also, the memory 1130 includes a variety of software constructs, such as those shown in FIGS. 1 and 2, which are realized in the form of executable instructions. When the executable instructions are run by the set of processors 1120, the set of processors 1120 carry out the operations of the software constructs. In an example, one or more of the set of processors 1120 may reside in the network card(s) 1110, which may facilitate high-speed communication over the network 140, thus promoting bandwidth and efficiency.

Figure 12:
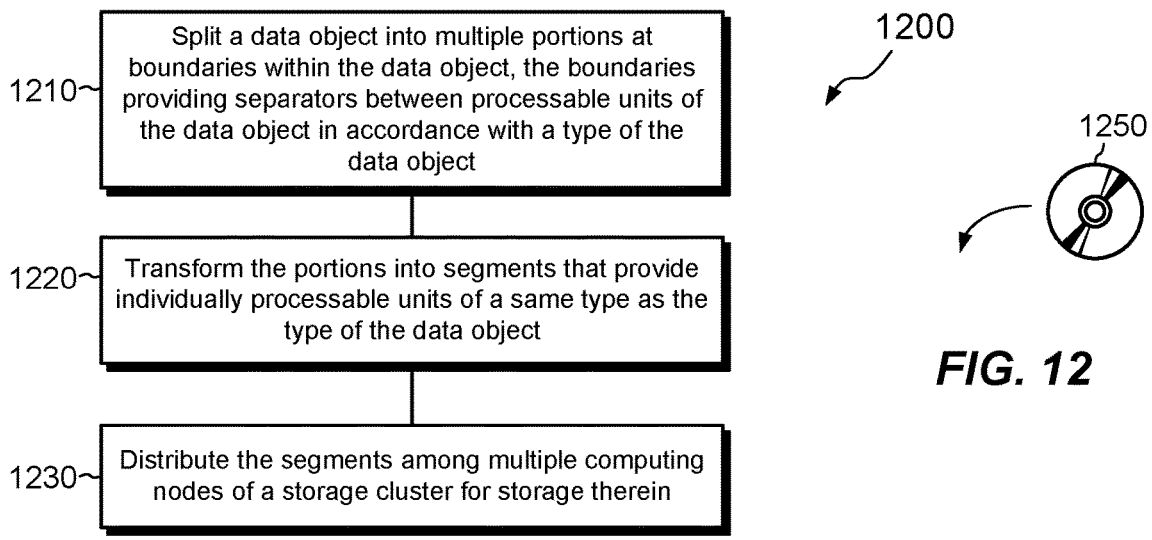
FIG. 12 is a flowchart showing an example method of managing data objects in accordance with one embodiment.
Figure 13:
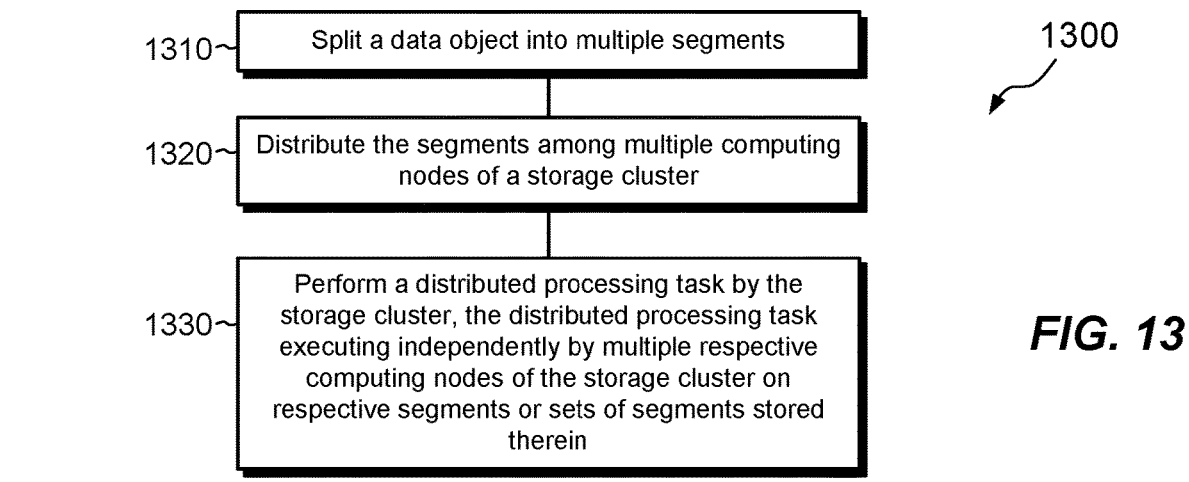
FIG. 13 is a flowchart showing an example method of managing data objects in accordance with another embodiment.
Figure 14:
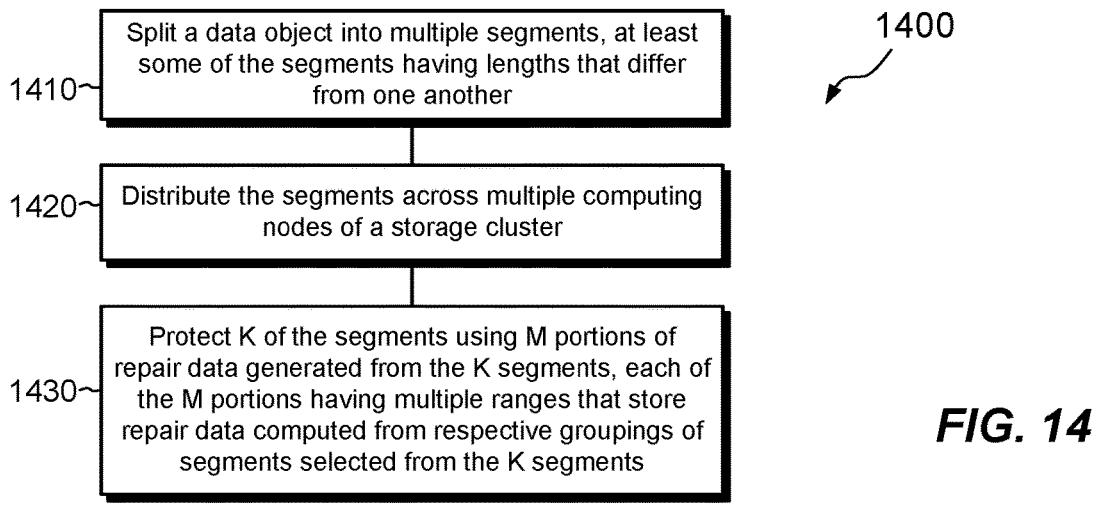
FIG. 14 is a flowchart showing an example method of managing data objects in accordance with yet another embodiment.

FIGS. 12, 13, and 14 show example methods 1200, 1300, and 1400, which may be carried out in connection with the environment 100 and provide a summary of some of the features described above. The methods 1200, 1300, and 1400. Such methods are typically performed, for example, by the software constructs described in connection with FIGS. 1 and 2. The various acts of methods 1200, 1300, and 1400 may be ordered in any suitable way. Accordingly, embodiments may be constructed in which acts are performed in orders different from those illustrated, which may include performing some acts simultaneously.

FIG. 12 shows an example method 1200 of managing data objects. At 1210, a data object 160 is split into multiple portions 250 at boundaries 252 within the data object 160 (see FIG. 2). The boundaries 252 provide separators between processable units 250 of the data object 160 in accordance with a type of the data object (e.g., CSV, JSON, XML, Parquet, video, and so forth). At 1220, the portions 250 are transformed into segments 170 that provide individually processable units of a same type as the type of the data object 160. For example, data and/or metadata may be copied from one portion 250 to other portions, and other modifications may be made, to reduce or eliminate dependencies between and among segments 170. At 1230, the segments 170 are distributed among multiple computing nodes 120 of a storage cluster 130 for storage therein.

FIG. 13 shows an example method 1300 of managing data objects. At 1310, a data object 160 is split into multiple segments 170, e.g., by operation of splitter 220 (FIG. 2). At 1320, the segments 170 are distributed among multiple computing nodes 120 of a storage cluster 130. At 1330, a distributed processing task is performed by the storage cluster 130. The distributed processing task executes independently by multiple respective computing nodes 120 of the storage cluster 130 on respective segments 170 or sets of segments 170 stored therein.

FIG. 14 shows an example method 1400 of managing data objects. At 1410, a data object 160 is split into multiple segments 170, at least some of the segments 170 having lengths that differ from one another (see FIGS. 7 and 8). At 1420, the segments 170 are distributed across multiple computing nodes 120 of a storage cluster 130. At 1430, K of the segments 170 are protected using M elements 810 of repair data generated from the K segments, each of the M elements 810 having multiple ranges (e.g., Rng1, Rng2, etc.) that store repair data computed from respective groupings of segments selected from the K segments (e.g., one grouping with K segments, one grouping with K−1 segments, and so forth).

An improved technique for managing data objects 160 in a storage cluster 130 includes splitting a data object 160 into multiple portions 250 at boundaries 252 within the data object 160. The technique further includes transforming the portions 250 of the data object 160 into segments 170 that provide individually processable units, and distributing the segments 170 among multiple computing nodes 120 of the storage cluster 130 for storage therein.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1250 in FIG. 12). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing data objects, comprising:
   splitting a data object into multiple portions at boundaries within the data object, the boundaries providing separators between processable units of the data object in accordance with a type of the data object;
   transforming the portions into segments that provide individually processable units of a same type as the type of the data object; and
   distributing the segments among multiple computing nodes of a storage cluster for storage therein; and
   protecting K of the segments distributed among the computing nodes using M elements of repair data generated from the K segments, each of the M elements having multiple ranges that store repair data computed from respective groupings of segments selected from the K segments, the respective groupings including groupings that consist of different numbers of segments.

2. The method of claim 1, wherein transforming the portions into segments includes adding or modifying metadata of a set of the portions.

3. The method of claim 2, wherein adding or modifying the metadata includes identifying header metadata of the data object and adding the header metadata or a modified version thereof to each of the set of portions.

4. The method of claim 2, wherein the data object is a CSV (comma-separated values) file having a header that identifies column names, and wherein adding or modifying the metadata includes identifying the header of the CSV file and adding the header to each of the set of portions.

5. The method of claim 2, wherein adding or modifying the metadata includes identifying footer metadata in one of the portions and adding the footer metadata or a modified version thereof to each of the set of portions.

6. The method of claim 2, wherein the data object is a Parquet file that includes multiple row groups and a footer, wherein splitting the data object includes providing a respective set of row groups in each of the set of portions, and wherein adding or modifying the metadata includes adding the footer or a modified version thereof to each of the set of portions.

7. The method of claim 6, wherein adding or modifying the metadata further includes adding a header to each of the set of segments, the header including a code that designates the Parquet file, and wherein adding the footer or modified version thereof to each of the set of portions includes (i) adding footer metadata that describes the set of row groups in the respective portion but not row groups in other portions, (ii) adding a length of the footer metadata, and (iii) adding the code that designates the Parquet file.

8. The method of claim 1, wherein the data object is a video file or stream that includes multiple frames, and wherein splitting the data object includes (i) identifying an i-frame in the video file or stream (ii) defining an end of a current segment as a frame located one frame prior to the identified i-frame, and (iii) defining a start of a next segment as the identified i-frame.

9. The method of claim 1, further comprising, prior to splitting the data object, reading a set of regions of the data object and identifying the type of the data object based on the set of regions, wherein splitting the data object includes searching the data object for a separator used to separate processable units of data objects of the identified type.

10. The method of claim 1, further comprising performing a distributed processing task by the storage cluster, the distributed processing task independently executing by multiple respective computing nodes of the storage cluster on respective segments or sets of segments stored therein.

11. The method of claim 10, further comprising storing object metadata that associates segments of the data object with locations in the storage cluster where the respective segments are stored.

12. The method of claim 11, wherein storing the object metadata includes storing an association between byte ranges of the data object and segments of the data object.

13. The method of claim 12, wherein performing the distributed processing task includes identifying, based on accessing the object metadata, a subset of the segments that contain data required by the processing task, and directing the processing task to computing nodes that store the subset of segments but not to computing nodes that do not store segments that are part of the subset of segments.

14. The method of claim 11, further comprising receiving, by a gateway, output of the processing task from a plurality of the computing nodes, and combining the output to produce output data.

15. The method of claim 14, wherein the output received from the plurality of computing nodes is received in an order, and wherein combining the output includes providing the output in the order received.

16. The method of claim 15, wherein the output received by the gateway from the plurality of computing nodes arrives in multiple RDMA (remote direct memory access) transmissions.

17. The method of claim 11, wherein the data object includes data records, and wherein the processing task defines an aggregate query that returns less than 1 kB of output data as results of the aggregate query.

18. The method of claim 1, further comprising generating the M elements of repair data, said generating including logically aligning the K segments and, for each $i^{th}$ shortest segment of a set of the K segments:
   identifying an unprocessed range of the $i^{th}$ shortest segment from which no range of repair data has yet been computed;

identify K−i other segments not previously identified as shortest segments;

identifying corresponding ranges of the K−i other segments that align with the unprocessed range of the $i^{th}$ shortest segment; and computing an $i^{th}$ range of each of the M elements based on the unprocessed range of the $i^{th}$ shortest segment and the corresponding ranges of the K−i other segments.

19. The method of claim 18, wherein said generating further includes:

identifying an unprocessed range of a last segment, from which no range of repair data has yet been computed; and providing a last range of each of the M elements as a respective replica of the unprocessed range of the last segment.

20. The method of claim 1, wherein transforming the portions into segments includes copying a region of data from a first portion adjacent to a boundary between a first portion and a second portion to the second portion.

21. The method of claim 1, wherein transforming the portions into segments includes copying an initial region a first portion to respective initial regions of each of a set of other portions.

22. The method of claim 21, further comprising:

receiving a processing request that specifies processing of the data object without use of a header; and in response to the processing request, processing the initial region of the first portion but ignoring the initial region of each of the set of other portions.

23. The method of claim 1 wherein, when splitting the data object into multiple portions, the method further comprises identifying a feature in a portion of the data object that enables faster processing and updating metadata associated with the portion to indicate that the portion includes the identified feature.

24. A computerized apparatus, comprising control circuitry that includes a set of processing units coupled to memory, the control circuitry constructed and arranged to:

split a data object into multiple portions at boundaries within the data object, the boundaries providing separators between processable units of the data object in accordance with a type of the data object;

transform the portions into segments that provide individually processable units of a same type as the type of the data object;

distribute the segments among multiple computing nodes of a storage cluster for storage therein; and protect K of the segments distributed among the computing nodes using M elements of repair data generated from the K segments, each of the M elements having multiple ranges that store repair data computed from respective groupings of segments selected from the K segments, the respective groupings including groupings that consist of different numbers of segments.

25. A computer program product including a set of non-transitory, computer-readable media having instructions which, when executed by control circuitry of a computerized apparatus, cause the computerized apparatus to perform a method of managing data objects, the method comprising:

splitting a data object into multiple portions at boundaries within the data object, the boundaries providing separators between processable units of the data object in accordance with a type of the data object;

transforming the portions into segments that provide individually processable units of a same type as the type of the data object;

distributing the segments among multiple computing nodes of a storage cluster for storage therein; and protecting K of the segments distributed among the computing nodes using M elements of repair data generated from the K segments, each of the M elements having multiple ranges that store repair data computed from respective groupings of segments selected from the K segments, the respective groupings including groupings that consist of different numbers of segments.

26. A method of managing data objects, comprising:

splitting a data object into multiple segments;

distributing the segments among multiple computing nodes of a storage cluster;

performing a distributed processing task by the storage cluster, the distributed processing task executing independently by multiple respective computing nodes of the storage cluster on respective segments or sets of segments stored therein; and protecting K of the segments distributed among the computing nodes using M elements of repair data generated from the K segments, each of the M elements having multiple ranges that store repair data computed from respective groupings of segments selected from the K segments, the respective groupings including groupings that consist of different numbers of segments.

27. The method of claim 26, further comprising storing object metadata of the data object, the object metadata associating the segments with respective portions of the data object.

28. The method of claim 27, wherein performing the distributed processing task includes:

accessing the object metadata of the data object and identifying therefrom the computing nodes that store the segments of the data object; and directing the identified computing nodes to execute the processing task on the respective segments.

29. The method of claim 27, wherein storing the object metadata includes storing an association between byte ranges of the data object and segments of the data object.

30. The method of claim 27, wherein performing the distributed processing task includes:

identifying, based on accessing the object metadata, a subset of the segments that contain data required by the processing task; and directing the processing task to computing nodes that store the subset of segments but not to computing nodes that do not store segments that are part of the subset of segments.

31. The method of claim 26, wherein splitting the data segment includes identifying boundaries in the data object between separate records or regions, and wherein the method further comprises:

creating segment metadata for a set of the segments, the segment metadata including content that transforms the respective segments into independently processable units of a same type as the data object; and providing the segment metadata in the respective segments when distributing the segments among the computing nodes.

32. The method of claim 31, wherein creating the segment metadata includes:

identifying a header of the data object; and providing the header or a modified version thereof in each of the set of segments.

33. The method of claim 32, wherein the data object is a CSV (comma-separated values) file, and wherein providing the header or modified version thereof includes providing the header at a beginning of each of the set of segments.

34. The method of claim 31, wherein creating the segment metadata includes:
identifying a footer of the data object; and
providing the footer or a modified version thereof in each of the set of segments.

35. The method of claim 34, wherein the data object is a Parquet file that includes multiple row groups, wherein splitting the data object includes providing a respective set of row groups in each of the set of segments, and wherein creating the segment metadata includes:
storing a footer in each of the set of segments, the footer including (i) footer metadata that describes the set of row groups in the respective segment but not row groups in other segments, (ii) a length of the footer metadata, and (iii) a code that designates a Parquet file.

36. The method of claim 35, wherein creating the segment metadata further includes, for each of the set of segments, providing the code as a header at a start of the segment.

37. The method of claim 35, wherein providing the respective set of row groups in each the set of segments includes providing a single row group in each of the set of segments.

38. The method of claim 26, further comprising receiving, by a gateway, output of the processing task from a plurality of the computing nodes and combining the output to produce output data.

39. The method of claim 38, wherein the output received from the plurality of computing nodes is received in an order, and wherein combining the output includes providing the output in the order received.

40. The method of claim 39, wherein providing the output in the order received includes inserting output from different ones of the plurality of computing nodes into the output data in an interleaved manner.

41. The method of claim 38, wherein the output received by the gateway from the plurality of computing nodes arrives in multiple RDMA (remote direct memory access) transmissions.

42. The method of claim 38, wherein the data object includes data records and wherein the processing task defines an aggregate query that returns less than 1 kB of output data as results of the aggregate query.

43. A method of managing data objects, comprising:
splitting a data object into multiple segments, at least some of the segments having lengths that differ from one another;
distributing the segments across multiple computing nodes of a storage cluster; and
protecting K of the segments using M elements of repair data generated from the K segments, each of the M elements having multiple ranges that store repair data computed from respective groupings of segments selected from the K segments, the respective groupings including groupings that consist of different numbers of segments.

44. The method of claim 43, wherein a first range of each of the M elements is computed from all K of the K segments, wherein a second range of the M elements is computed from K−1 of the K segments, and wherein a third range of the M elements is computed from K−2 of the K segments.

45. The method of claim 44, wherein a fourth range of the M elements is based on only a single one of the K segments.

46. The method of claim 43, further comprising generating the M elements of repair data, said generating including:
logically aligning the K segments;
identifying a shortest segment and K−1 other segments of the K segments;
identifying corresponding ranges that align with the shortest segment in the K−1 other segments; and
computing a first range of each of the M elements based on the shortest segment and the corresponding ranges of the K−1 other segments.

47. The method of claim 43, further comprising generating the M elements of repair data, said generating including logically aligning the K segments and, for each $i^{th}$ shortest segment of a set of the K segments:
identifying an unprocessed range of the $i^{th}$ shortest segment from which no range of repair data has yet been computed;
identify K−i other segments not previously identified as shortest segments;
identifying corresponding ranges of the K−i other segments that align with the unprocessed range of the $i^{th}$ shortest segment; and
computing an $i^{th}$ range of each of the M elements based on the unprocessed range of the $i^{th}$ shortest segment and the corresponding ranges of the K−i other segments.

48. The method of claim 47, wherein said generating further includes:
identifying an unprocessed range of a last segment, from which no range of repair data has yet been computed; and
providing a last range of each of the M elements as a respective replica of the unprocessed range of the last segment.

49. The method of claim 43, wherein the K segments form a first repair group that includes data of the data object, and wherein the multiple segments formed when splitting the data object include a set of additional repair groups each including no greater than K segments.

50. The method of claim 49, wherein distributing the segments across multiple computing nodes of the storage cluster includes distributing multiple segments of different respective repair groups to a single computing node of the storage cluster.

51. The method of claim 49, wherein distributing the segments across multiple computing nodes of the storage cluster includes distributing no two segments of a single repair group to a single computing node of the storage cluster.

52. The method of claim 49, further comprising establishing a target minimum size of the segments based upon (i) a size of the data object, (ii) a desired maximum segment size that can be efficiently processed by the computing nodes, (iii) the number K of segments, and (iv) a number R of repair groups.

53. The method of claim 43, wherein splitting the data object includes:
defining a starting point of a segment;
scanning forward from the starting point to identify an ending point of the segment as a first boundary of the data object after reaching the target minimum size; and
defining an extent of the segment based on a portion of the data object that begins at the starting point and ends at the ending point.

54. The method of claim 53, wherein the first boundary corresponds to one of:
   an end of a database record;
   a newline delimited in a log file or CSV file;
   an end of a row group in a Parquet file; or
   a frame that immediately precedes an i-frame in a video file or stream.

* * * * *